United States Patent [19]
Mochizuki et al.

[11] Patent Number: 5,189,535
[45] Date of Patent: Feb. 23, 1993

[54] LIQUID CRYSTAL DISPLAY ELEMENT AND METHOD FOR DRIVING SAME

[75] Inventors: Akihiro Mochizuki, Atsugi; Fumiyo Onda, Kawasaki; Toshiaki Yoshihara, Atsugi; Masayuki Iwasaki, Saitama; Yasuo Yamagishi, Zama, all of Japan

[73] Assignee: Fujitsu Limited, Kawasaki, Japan

[21] Appl. No.: 662,103

[22] Filed: Feb. 28, 1991

Related U.S. Application Data

[60] Division of Ser. No. 441,047, Nov. 22, 1989, which is a continuation of Ser. No. 291,335, Dec. 28, 1988, abandoned, which is a continuation of Ser. No. 130,324, Dec. 8, 1987, abandoned.

[30] Foreign Application Priority Data

| Dec. 11, 1986 | [JP] | Japan | 61-293514 |
| Dec. 18, 1986 | [JP] | Japan | 61-300134 |
| Dec. 18, 1986 | [JP] | Japan | 61-300140 |
| Mar. 14, 1987 | [JP] | Japan | 62-057917 |

[51] Int. Cl.$^5$ ............... G02F 1/133; G09G 3/36
[52] U.S. Cl. ............... 359/55; 359/101; -359/105; 359/78; 340/784
[58] Field of Search ............... 350/346, 332, 341, 340, 350/333, 331 R; 340/784

[56] References Cited

U.S. PATENT DOCUMENTS

| 3,976,362 | 8/1976 | Kawakami | 350/333 |
| 3,998,523 | 12/1976 | Otomo | 359/245 |
| 4,272,162 | 6/1981 | Togashi et al. | 350/341 |
| 4,317,115 | 2/1982 | Kawakami et al. | 340/784 |
| 4,447,132 | 5/1984 | de Zwart | 350/346 |
| 4,490,015 | 12/1984 | Kawanada et al. | 350/340 |
| 4,571,585 | 2/1986 | Stein et al. | 350/346 |
| 4,601,542 | 7/1986 | Meyer | 359/75 |

FOREIGN PATENT DOCUMENTS

| 0111918 | 8/1980 | Japan | 350/346 |
| 0105724 | 7/1982 | Japan | 350/341 |
| 0299821 | 12/1987 | Japan | 350/346 |

OTHER PUBLICATIONS

Mochizuki et al—"New Nematic-Cholesteric LCD Using Hysteresis Behavior" Proceedings of the SID—vol. 26–No. 4-1985-243-248.
Tani et al—"Storage Type Liquid Crystal Matrix Display" SID 79 Digest-1979-pp. 114–115.

Primary Examiner—William L. Sikes
Assistant Examiner—Tai V. Duong
Attorney, Agent, or Firm—Staas & Halsey

[57] ABSTRACT

A liquid crystal display element comprising a liquid crystal composition having an optically active compound as at least one constituent and showing a cholesteric phase in a bulk state, wherein the liquid crystal composition is arranged between substrates, at least one of which is provided with a transparent electrode, so that long axes of individual liquid crystal molecules are in parallel to one another an are oriented in the same direction as the surfaces of the substrates, and the long axes of the molecules are uniformly aligned in parallel, vertically or inclined to the surfaces of the substrates, wherein the gap d ($\mu$m) between the substrates and the size p ($\mu$m) of the helical pitch shown by the cholesteric phase liquid crystal at room temperature when an electric field is not applied satisfy the following relationships:

$$d/p \geq 1.$$

12 Claims, 27 Drawing Sheets

Fig. 6(d) EFFECTIVE VOLTAGE APPLIED TO SEMI-SELECTED AND NON-SELECTED POINTS
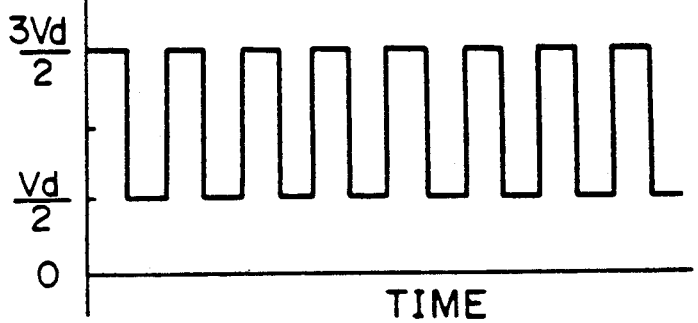
Fig. 6(e) EFFECTIVE VOLTAGE APPLIED TO SELECTED POINTS
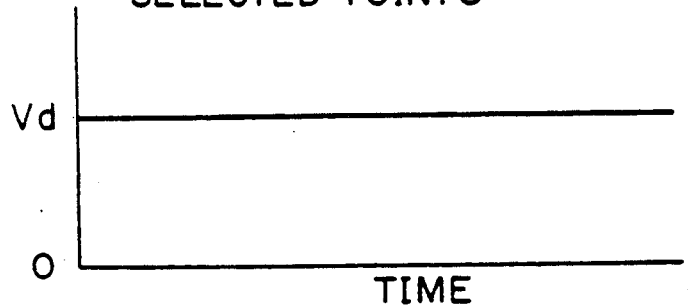
Fig. 6(f)
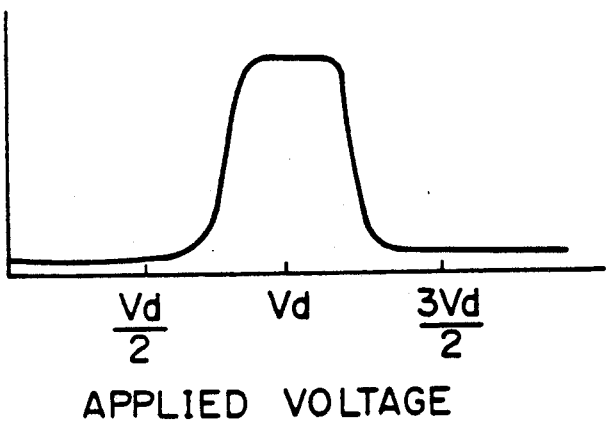

Fig. 9
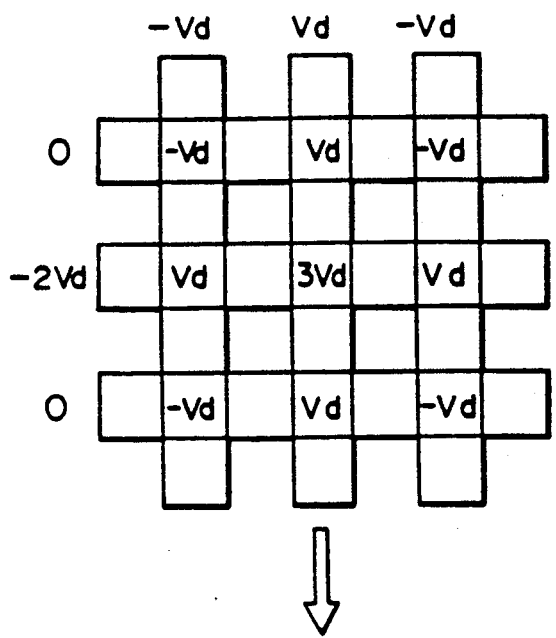
DRIVING VOLTAGE BY REFRESH DRIVING
($\frac{1}{3}$ BIAS VOLTAGE LEVELING METHOD
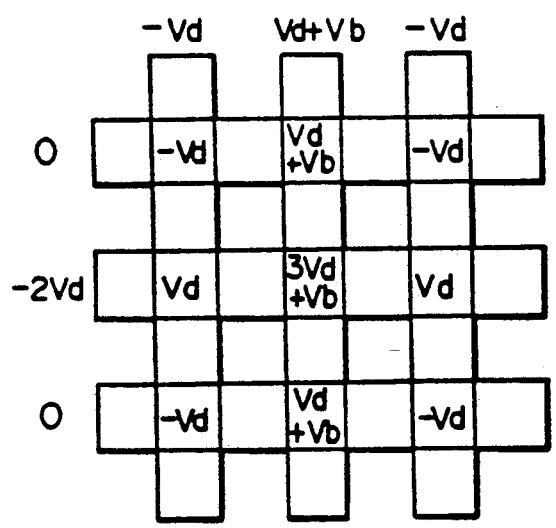
DRIVING VOLTAGE
($\frac{1}{3}$ BIAS VOLTAGE LEVELING METHOD
+
APPLICATION OF BIAS VOLTAGE $V_b$

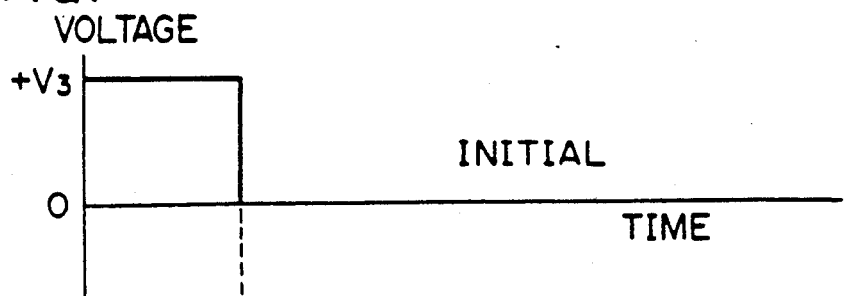
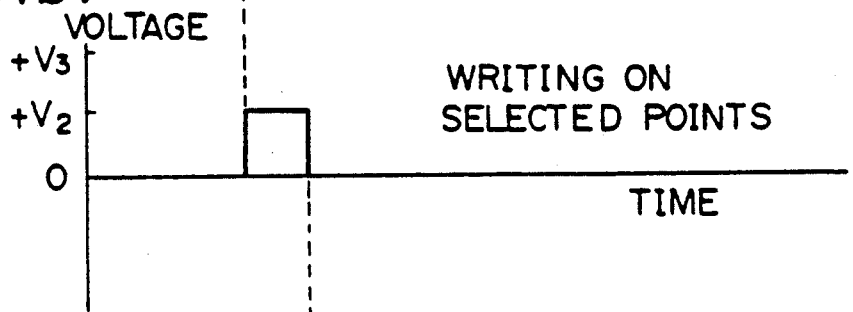
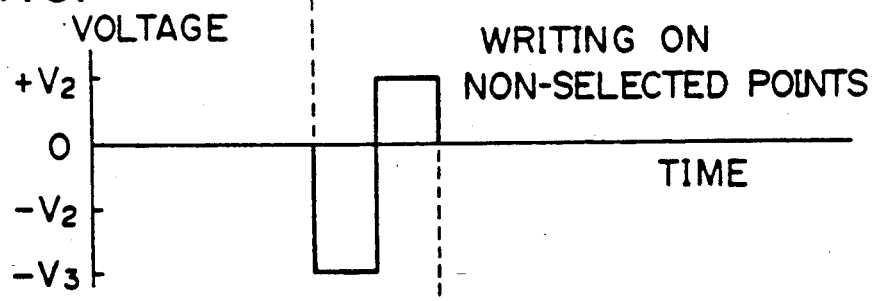
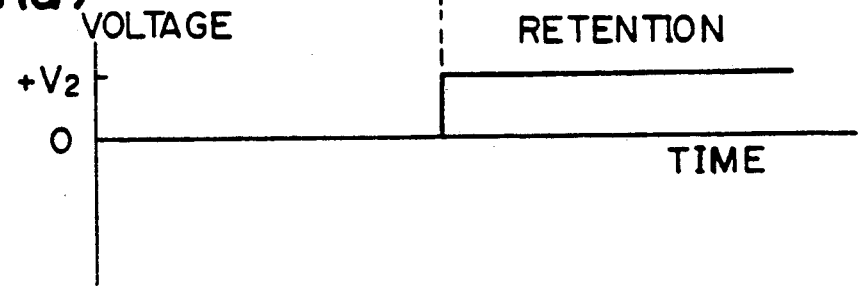

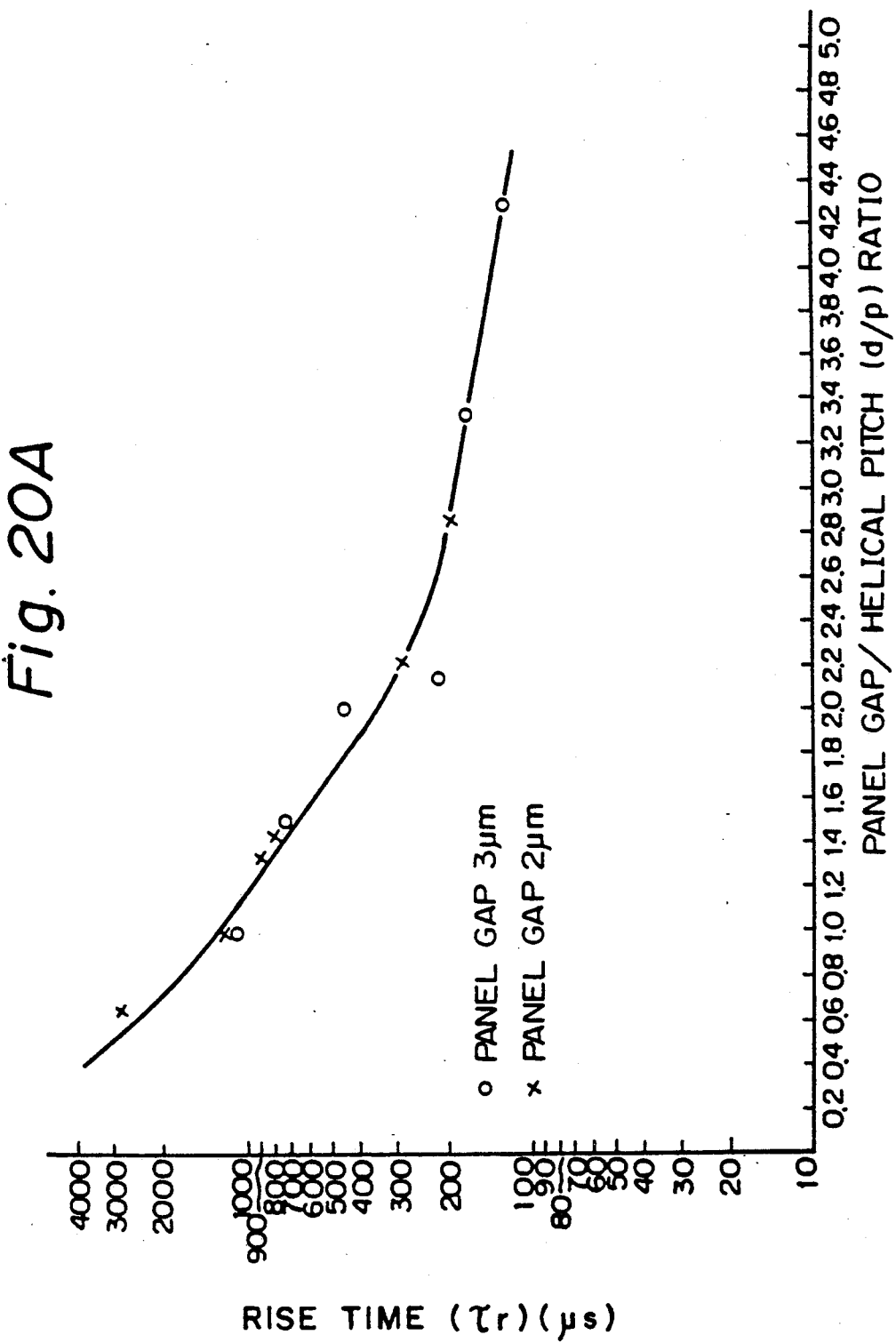

LIQUID CRYSTAL DISPLAY ELEMENT AND METHOD FOR DRIVING SAME

This application is a division of application Ser. No. 07/441,047, filed Nov. 22, 1989, which is a continuation of application Ser. No. 07/291,335, filed Dec. 28, 1988, which is a continuation of Ser. No. 07/130,324 filed Dec. 8, 1987, both now abandoned.

BACKGROUND OF THE INVENTION

1. Field of the Invention

The present invention relates to a liquid crystal display element. More particularly, the present invention relates to a liquid crystal display element which can realize a fast response, a broadening of the viewing angle, and an increase of the contrast ratio in a high information content liquid crystal display element to be driven by refresh driving. Furthermore, the present invention relates to a method for driving this liquid crystal display element.

2. Description of the Related Art

The use of liquid crystal elements in various fields such as table computers, watches, hand-held computers, word processors, portable television sets and the like is wide-spread. In these circumstances, the liquid crystal display element is now required to function as a display device, replacing the cathode ray tube (CRT). CRT is an emissive display that can cause asthenopia in an operator, and since the CRT depth is great, the size of the entire apparatus is increased and the design of the apparatus is restricted. Accordingly, the development of a compact flat panel reflection type display which does not cause eye fatigue is strongly desired. Some of the liquid crystal displays used as such elements almost meet this requirement, but still fail to match the CRT from the viewpoint of functions. Especially, the display speed is as low as several hundreds milliseconds per picture, and these liquid crystal displays are not practical for an animation display. Although a quasi animation display becomes possible if the rewriting frequency per unit time is reduced, disadvantages such as a narrowing of the viewing angle and a reduction of the contrast ratio arise. Therefore, the development of a liquid crystal element having a fast response time, a wide viewing angle, and a high contrast ratio is strongly desired.

Conventional refresh drive liquid crystal displays are divided into a twisted nematic (TN) type and a supertwisted birefringence effect (SBE) type, which is a modification of the TN type. In each display mode, as shown in FIG. 4, liquid crystal molecules are continuously twisted from top to bottom by 90° to 270° by an orientation treatment of aligning the liquid crystal and applying the aligned liquid crystal on upper and lower substrates. The resulting panel is placed between two polarizing films and a display is realized by changing the alignment of liquid crystal molecules by switching an electric field ON and OFF.

The TN and SBE used in word processors and hand-held computers are of the refresh drive type and a high information content display is possible to a certain extent. Accordingly, TN and SBE can be used as character displays. In the TN and SBE type liquid crystal displays, liquid crystal molecules aligned horizontally to the substrates, say homogeneous alignment are twisted toward the lower substrate from the upper substrate, as shown in FIG. 4, and the liquid crystal layer as a whole has a birefringence effect on the light incident in the direction vertical to the substrates, to effect switching in the oscillation direction of the light. Thus, in conventional TN and SBE displays, since the display is effected by rotation of the oscillation plane of the light by a continuous change of the direction of the group of liquid crystal molecules, if an electric field drive is applied, the direction of individual liquid crystals is changed from a horizontal alignment to a vertical alignment, against the mutual action among the liquid crystal molecules, and scores of milliseconds to several hundred milliseconds are necessary for this change of the direction. Especially, in an SBE capable of a high information content display, the ratio of the effective voltage Vs applied to a selected point in the time division drive by a matrix electrode to the effective voltage Vns applied to a non-selected point, that is, the ratio Vs/Vns, can be reduced. Namely, since the rise of the light transmission is equal to the applied voltage, the value of the voltage applied when switching between selected and non-selected points is small, and thus the force for changing the direction of liquid crystal molecules is weak and the response is delayed. This is because, since the alignment direction of liquid crystal molecules is continuously changed from the upper substrate to the lower substrate, the force for orientating the liquid crystal molecules is given a continuous gradient along the thickness direction of the liquid crystal layer, with the result that the direction is gradually changed from portions where the orientating force is weak. In an SBE capable of a high information content display with a relatively high contrast ratio, although the response is delayed, the display background is tinged with yellow or blue, and therefore, the SBE is defective in that a color display by a color filter system is practically impossible.

Under this background, as a means for solving the foregoing problems, there has been proposed a display element utilizing a ferroelectric liquid crystal. More specifically, a ferroelectric liquid crystal display (FLC) reported by Noel A. Clark et al [Appl. Phys. Lett., 36, 899 (1980)] is characterized in that a liquid crystal of the chiral smectic C or chiral smectic H phase is aligned in parallel to the substrate. If the liquid crystal of the chiral smectic C or chiral smectic H phase is uniformly aligned in parallel to the substrate, the directions of dipole moments of individual liquid crystal molecules become uniformly upward or downward relative to the substrate, with the result that a spontaneous polarization is caused. By reversing the direction of this spontaneous polarization upside down to the substrate, light switching is effected. This method is the FLC system. In the FLC system, since the spontaneous polarization of the liquid crystal is utilized as the driving source, a fast response is made possible by a strong coupling of the spontaneous polarization with an external electric field, and FLC a memory function such that the once reversed spontaneous polarization maintains this state unless an electric field having a reverse polarity is applied again.

However, since the FLC is fabricated by using a chiral smectic C or chiral smectic H liquid crystal having a layer structure, it is difficult to align individual molecules in parallel to the substrate without destroying the layer structure, and even if a desired alignment is obtained, since the layer structure is thermally unstable, the layer structure is easily broken by a heat cycle or mechanical shock. This is a defect of the FLC.

SUMMARY OF THE INVENTION

A primary object of the present invention is to solve the foregoing problems and provide a liquid crystal display element having a fast response and a wide viewing angle, which is capable of a high information content display.

More specifically, in accordance with the present invention, there is provided a liquid crystal display element comprising a liquid crystal composition having an optically active compound as at least one constituent and showing a cholesteric phase in a bulk state, wherein the liquid crystal composition is arranged between substrates, at least one of which is provided with a transparent electrode, so that long axes of individual liquid crystal molecules are in parallel to one another and are oriented in the same direction to the surfaces of the substrates, and the long axes of the molecules are uniformly aligned in parallel, vertically or inclined to the surfaces of the substrates, wherein the gap d (μm) between the substrates and the size p (μm) of the helical pitch shown by the cholesteric phase liquid crystal at room temperature when an electric field is not applied satisfy the following relationship:

$$d/p \geq 1.$$

By the long axis of the molecule referred to herein is means the axis in the longitudinal direction of a rod-shaped liquid crystal molecule.

According to a preferred embodiment of the present invention, a liquid crystal showing a cholesteric phase is sealed in a cell having a narrow gap of about 1 to 5 μm, preferably about 1.5 to 3 μm, and the liquid crystal alignment-regulating force by the liquid crystal-oriented film is caused to act substantially uniformly from the upper substrate to the lower substrate in the panel, whereby the liquid crystal molecules are aligned in a specific direction (for example, in parallel, vertically or inclined to the substrates) to eliminate the helical structure of the cholesteric phase and a simultaneous high information content and fast switching display becomes possible. In short, the liquid crystal display element of the present invention is characterized in that a cholesteric phase liquid crystal having an inherent helical structure is forcibly uniformly aligned by the alignment-regulating force. This aligned liquid crystal is called PAC (parallel aligned chiralnematic) hereinafter.

BRIEF DESCRIPTION OF THE DRAWINGS

FIGS. 6(a)–6(f) are diagrams illustrating the drive principle of the present invention;

FIGS. 9 and 10(a)–10(c) are diagrams illustrating the drive principle in the present invention;

FIGS. 14(a)–14(d) are diagrams illustrating an example of the drive wave form in the present invention;

DESCRIPTION OF THE PREFERRED EMBODIMENTS

Figure 1:
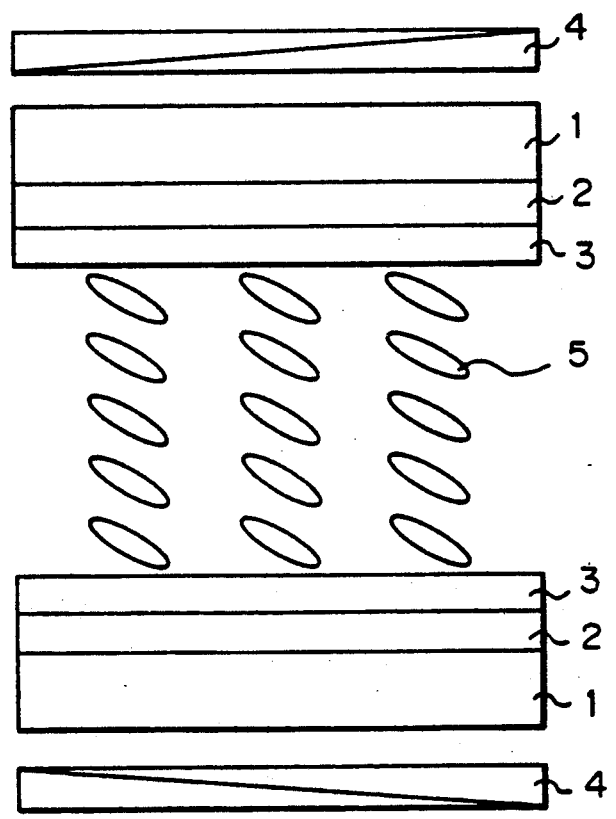
FIG. 1 is a diagram illustrating a panel structure of PAC.

In the present invention, the cholesteric phase liquid crystal includes a cholesteric liquid crystal (steroid type liquid crystal), a chiralnematic liquid crystal, a mixed liquid crystal of a nematic liquid crystal and a cholesteric liquid crystal or chiralnematic liquid crystal (the content of the cholesteric liquid crystal of chiralnematic liquid crystal is at least 3% by weight based on the total mixture), and a mixture of a nematic liquid crystal and an optically active substance having a sufficient compatibility with the liquid crystal (for example, l-menthol or l-adrenaline) (the content of the optically active substance is at least 3% by weight based on the entire mixture). In the cholesteric phase liquid crystal, the helical pitch shown at room temperature when an electric field is not applied is smaller than 1.5 μm. This is because, in the case of a liquid crystal having a long helical pitch, even if the liquid crystal is sealed in the panel and the helix is unwound by a strong alignment-regulating force, the optical rotatory power is not sufficiently increased and the light switching becomes unsatisfactory. In general, in the helix-unwound state, the shorter the helical pitch, the higher the optical rotatory power. Accordingly, to realize an effective display, the pitch length should be shorter than 1.5 μm.

The thickness of the layer (anchoring layer) of the cholesteric phase liquid crystal which undergoes regulation of the alignment by the interfacial mutual action with the liquid crystal-aligned film on the surface of the substrate should be at least ⅓ of the entire thickness of the liquid crystal layer. The entire thickness of the liquid crystal layer may be about 1 to 5 μm.

The PAC is characterized in that the liquid crystal is uniformly aligned from the upper substrate to the lower substrate. Namely, since the liquid crystal is uniformly aligned, the liquid crystal responds uniformly to the applied electric field in any portion. If the alignment-regulating force for aligning the liquid crystal is weak, that is, if the thickness of the anchoring layer is small, since liquid crystal molecules respond quickly to the applied electric field, a definite threshold value (electric field-light transmission) disappears and a high information content display by refresh driving becomes impossible. Accordingly, in order to make the threshold value sharp and obtain a high information content display, the thickness of the anchoring layer must be increased to regulate the motion of liquid crystal molecules to the applied electric field. For this purpose, the thickness of the anchoring layer should be at least ⅓ of the entire thickness of the liquid crystal layer. This is because, if the thickness of the anchoring layer is at least ⅓ of the entire thickness of the liquid crystal layer the liquid crystal other than the liquid crystal of the anchoring layer is strongly regulated by the intermolecular mutual action of liquid crystal molecules. Obviously, the thicker the anchoring layer, the greater the effect.

FIG. 1 illustrates an example of the liquid crystal display element of the present invention. A transparent electrode 2 is attached to a glass substrate 1 and an oriented film 3 is attached to the surface of the transparent electrode. This oriented film is formed by coating an organic polymer on the electrode or vacuum-depositing an inorganic compound on the electrode. A cholesteric phase liquid crystal 5 is sealed in the so-constructed cell to form a panel. When performing the operation, a polarizing film 4 is attached to the panel.

Where the so-constructed liquid crystal display element is driven by applying an electric field, since the panel gap is narrow, the molecule alignment-regulating (anchoring) force by the liquid crystal molecule-aligned film acts entirely from the upper substrate to the lower substrate, and therefore, all of the liquid crystal molecules are uniformly aligned in parallel, vertically or inclined (slightly inclined in FIG. 1) to the substrate.

If the cholesteric phase liquid crystal in which the helical structure is eliminated by the alignment-regulating force is aligned in parallel, vertically or inclined to the substrate, and individual liquid crystals are uniformly aligned in parallel to one another, the liquid crystals are tightly fixed by the alignment-regulating force.

Figure 2A:
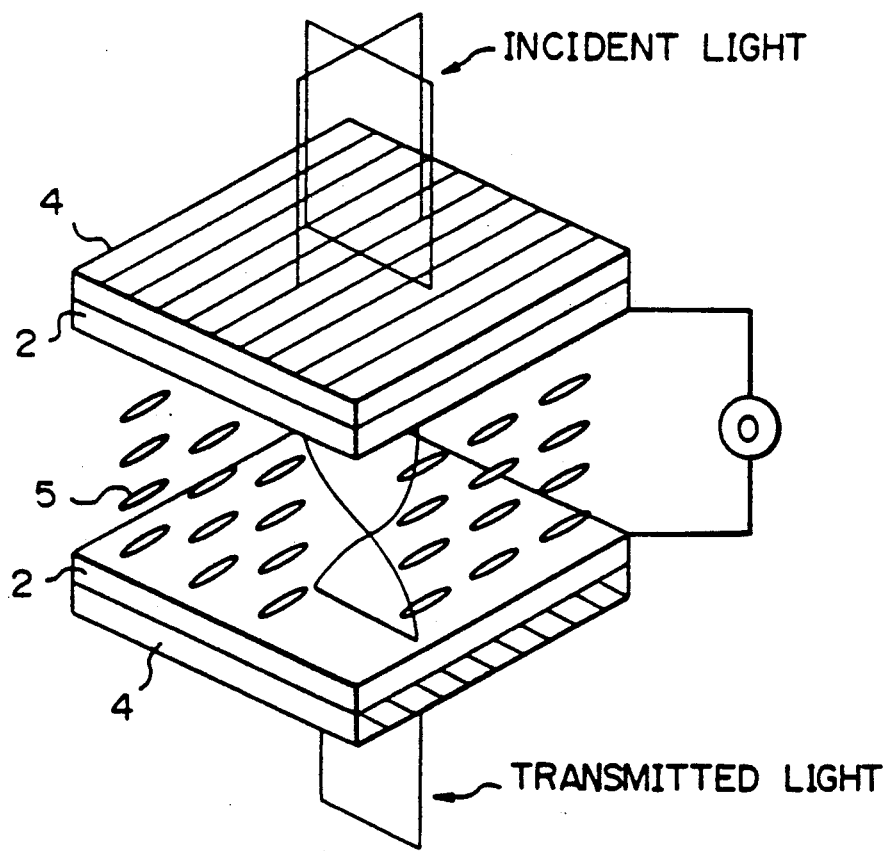
FIGS. 2(a) and 2(b) are diagrams illustrating the driving principle of a PAC.
Figure 2B:
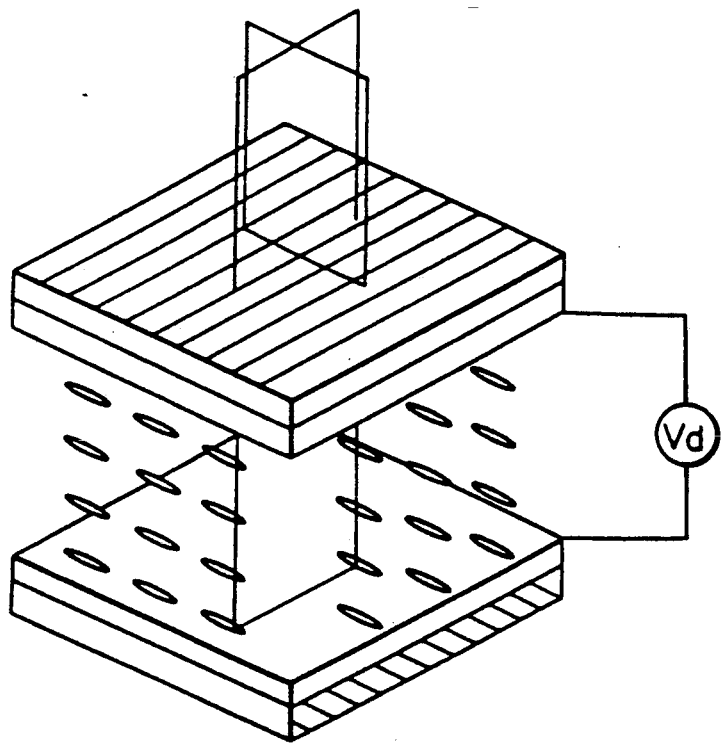

If the panel in this state is placed between two polarizing plates 4 having a crossing angle of cross Nichol or a crossing angle close thereto, the liquid crystal layer as a whole shows a birefringence by dint of the uniformly aligned chiralnematic liquid crystal (cholesteric liquid crystal). As a result, the incident light having the oscillation plane made even by the polarizing plates is circumpolarized by the liquid crystal layer to agree with the polarizing plane of the second polarizing plate, and the light is transmitted through this polarizing plane to produce a bright state. This state is shown in FIG. 2(a). Note, in FIG. 2, reference numeral 2 represents a glass substrate. The structure of this glass substrate is the same as the structure shown in FIG. 1, and the transparent electrode and oriented film are formed on the glass substrate.

When an electric field is applied to the uniformly aligned liquid crystal, the electric field couples with a dielectric polarization induced in the liquid crystal to generate a torque for rotating the liquid crystal molecules. In the conventional TN and SBE, since this torque is much stronger than the alignment-regulating force acting on the central portion of the panel, the liquid crystal molecules gradually change the direction toward the interface portion of the substrate from the central portion. In contrast, in the PAC, the alignment-regulating force acts strongly on both the central portion and interface portion of the substrate, and therefore, if the applied voltage is about 10 V, the direction of the molecules (change of laterally aligned molecules to longitudinally aligned molecules) is not changed. However, in the case of a PAC, unlike TN and SBE, the liquid crystal molecules per se have an optical rotatory power, and if the liquid crystal molecules are deviated only slightly from the equilibrium position when an electric field is not applied, by a voltage of about 10 V, the optical rotation of the entire liquid crystal layer is changed to produce a dark state [FIG. 2(b)], and light switching under a cross Nichol becomes possible. As illustrated above, in the PAC, light switching can be performed by a slight drive by a relatively weak electric field of the liquid crystal molecules having an optical rotatory power, which are supported by the strong alignment-regulating force. Therefore, a liquid crystal display having an excellent rise sharpness is possible at a fast switching speed, a high contrast ratio, and a wide viewing angle.

The reason for the high-speed switching is that, in the first place, the degree of the change of alignment of the liquid crystal molecules is small from the viewpoint of space, and in the second place, individual liquid crystal molecules simultaneously change direction in the entire liquid layer.

The reason for the high contrast ratio is that, in the PAC and unlike TN and SBE, liquid crystal molecules constituting the liquid crystal layers are uniformly aligned, and therefore, light switching can be performed at a high efficiency.

The reason for the wide viewing angle is that, in the PAC and unlike TN and SBE, liquid crystal molecules constituting a liquid crystal layer are in a uniform state and the incidence angle dependency is smaller than that in the TN and SBE.

The reason for the steep threshold properties is that, since the strong alignment-regulating force acts substantially uniformly on the entire liquid crystal layer, all of the liquid crystal molecules move for the first time when the applied electric field exceeds a certain threshold value.

Furthermore, because of the foregoing characteristics, the PAC is distinguishable over SBE in that the display background is not colored, and if the PAC is combined with a conventional mosaic color filter, a full-color display becomes possible.

If the liquid crystal display element of the present invention is driven by a method described below, cross talk is eliminated even in the case of multiplexing driving (time division driving), and a high information content display becomes possible at a fast switching without coloration of the background.

More specifically, in accordance with the present invention, there is provided a preferred method for driving the above-mentioned liquid crystal display element of the present invention, which is characterized in that a bias voltage is applied so that, in a steep curve defined by the relationship between an applied voltage and a light transmission, observed when a voltage is applied for driving a liquid crystal, the light transmission is changed as low → high → low with an increase of the applied voltage.

In accordance with a preferred embodiment of the present invention, in a liquid crystal panel comprising a matrix electrode or a segment electrode, a display is effected by alternately applying three voltages corresponding to low, high, and low levels of the light transmission in the above-mentioned rise sharpness curve.

Figure 5:
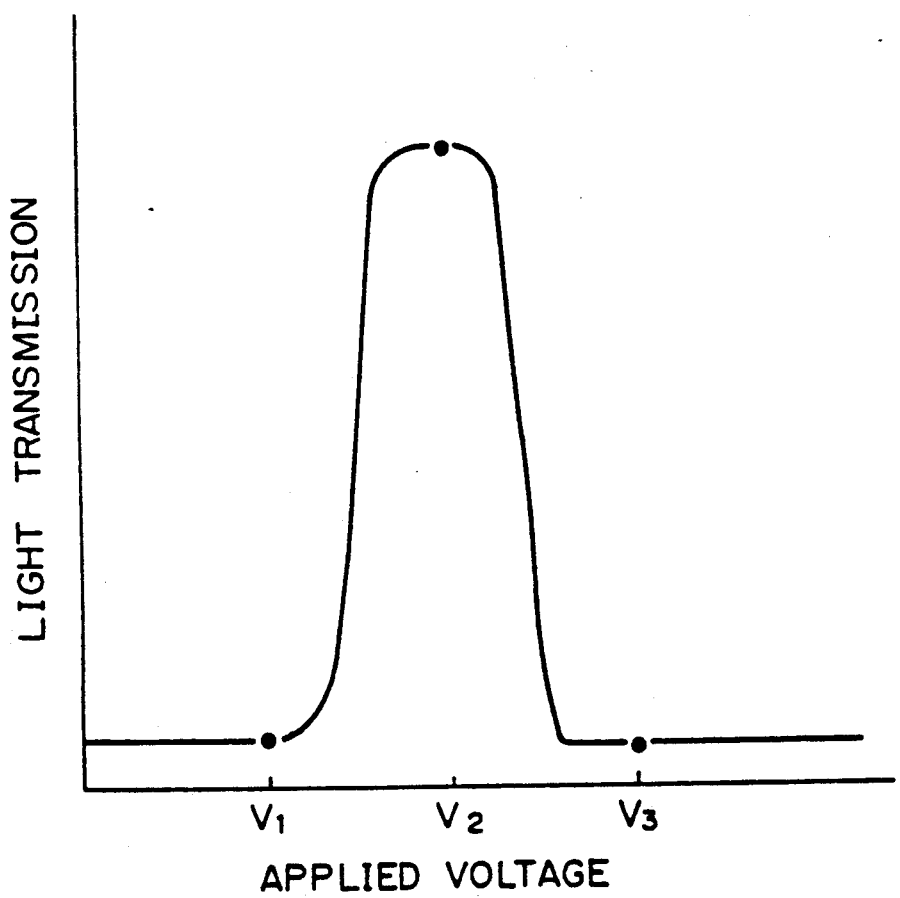
FIG. 5 is a diagram illustrating the concept of the present invention.

FIG. 5 is a diagram illustrating the concept of the present invention. In the PAC mode, if a specific bias voltage is set, the light transmission is lowered at a lower voltage $V_1$ or a higher voltage $V_3$, and the light transmission is elevated at an intermediate voltage $V_2$. By utilizing this applied voltage dependency of the light transmission, cross talk can be prevented by driving the liquid crystal so that a voltage $V_1$ or $V_3$ is always applied to a non-selected point or semi-selected point and a voltage $V_2$ is applied to a selected point.

Figure 6A:
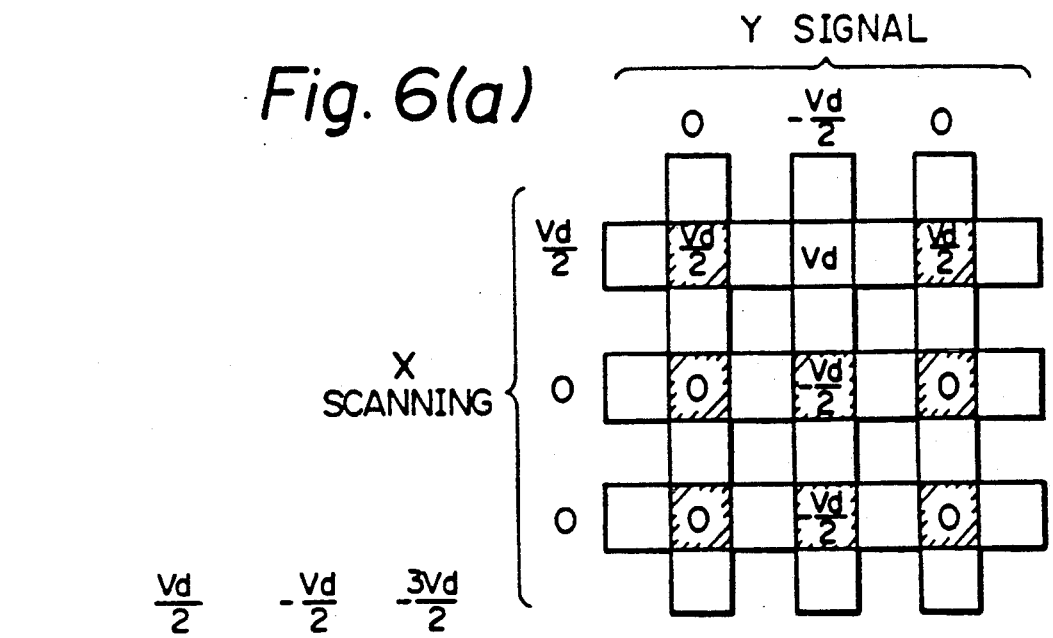
Figure 6B:
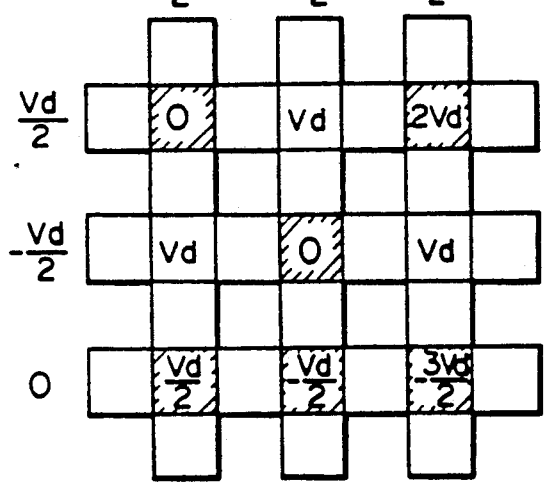
Figure 6C:
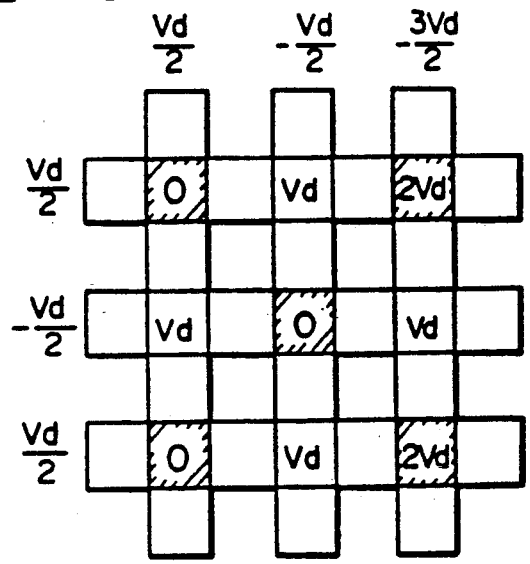

In the PAC mode in which the helical structure of the chiralnematic liquid crystal is eliminated by the liquid crystal alignment-regulating force by the liquid crystal-oriented film, since individual liquid crystal molecules or masses of liquid crystal molecules have an optical rotatory power, if a uniform state is produced by the alignment-regulating force, the liquid crystal layer as a whole is given an optical rotatory power at a high contrast. If a bias voltage is applied to the liquid crystal in this state, by the dielectric constant anisotropy of the liquid crystal, the liquid crystal molecules tilt against the alignment-regulating force, and an equilibriated state is produced at the position where the alignment-regulating force is balanced with the torque of the liquid crystal molecules by an electric field. If a drive voltage is applied to the liquid crystal at this position, a larger torque is generated on the liquid crystal molecules, and the liquid crystal molecules begin to deviate from the position of equilibrium. Therefore, the quantity of the transmitted light is gradually increased in the two polarizing filters. If the applied voltage is further increased, tilting of the liquid crystal molecules is further increased, and with this increased tilting, the optical rotatory power is changed and the polarized light component passing through the filters is increased, with the result that the quantity of the transmitted light is again reduced. If by utilizing this phenomenon the multiplexing driving by an X-Y simple matrix electrode structure is carried out so that, as shown in FIG. 6, a voltage of $Vd/2$, a voltage of $3Vd/2$ or a voltage higher than $3Vd/2$ or lower than $Vd/2$ is always applied to a non-selected point or semi-selected point and a voltage of $2Vd/2$ ($=Vd$) is always applied to a selected point, a high information content liquid crystal display can be realized at a high transmission ratio, that is, a high contrast ratio, and a high response speed without cross talk or coloration of the background.

Figure 8:
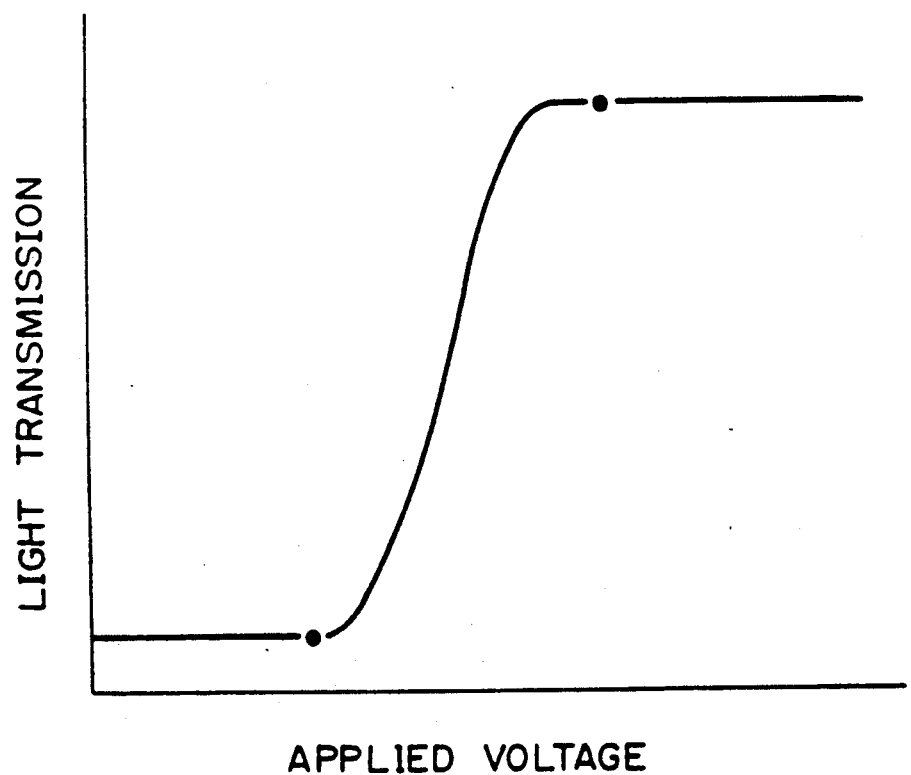
FIG. 8 is a graph illustrating the relationship between the applied voltage and light transmission in a conventional TN or SBE.

In contrast, in the drive mode of the TN or SBE by conventional multiplexing driving, the relationship between the applied voltage and light transmission is as shown in FIG. 8. More specifically, with an increase of the applied voltage, the light transmission rises, and after the light transmission reaches a saturation value, the light transmission is kept at the saturation value irrespective of the applied voltage. Thus, in a conventional TN or SBE, the light transmission is changed to a lower level or a higher level according to whether the applied voltage-light transmission relationship is higher or lower than the threshold value voltage. Therefore, according to this method, it is impossible to obtain a high information content display at a fast switching speed, without cross talk or coloration of the background, by the multiplexing drive.

According to another method for driving the liquid crystal display element of the present invention, a stable gray-scaled graduation display can be obtained. Namely, in accordance with the present invention, there is provided another preferred method for driving the above-mentioned liquid crystal display element of the present invention, which is characterized in that a bias electric field is superimposed on an alternating current electric field for driving the liquid crystal.

FIG. 9 is a conceptual diagram showing a liquid crystal-driving wave form and a bias voltage wave form in the present invention. Since the bias voltage acts at an effective value, the bias voltage may be a direct current or an alternating current faster than that of the driving voltage.

Figure 10:
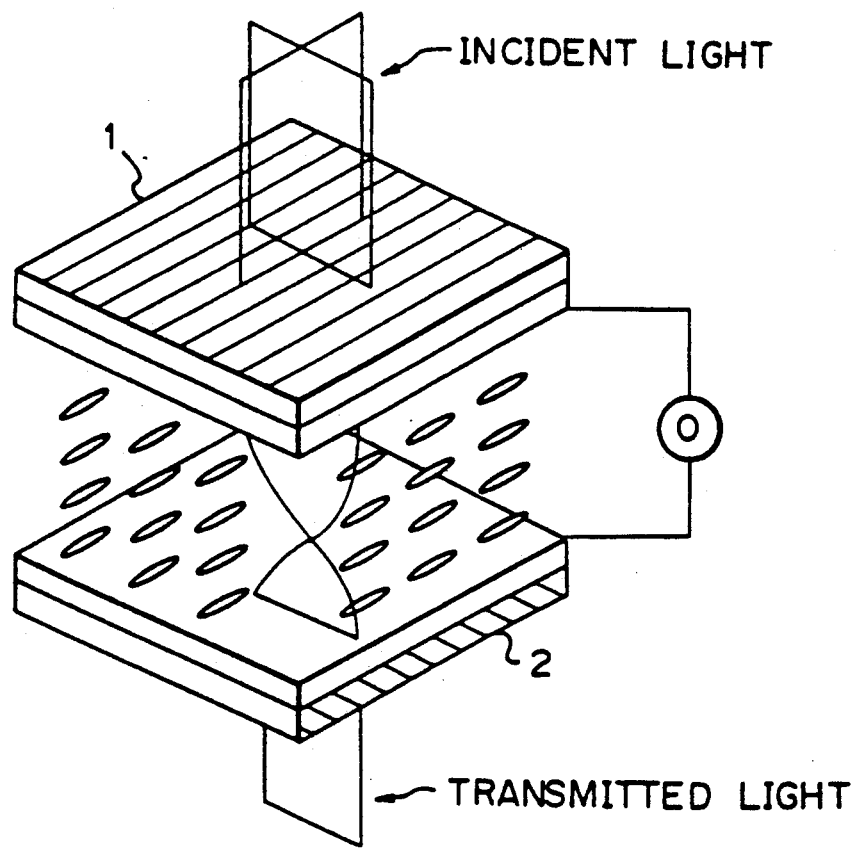
Figure 10B:
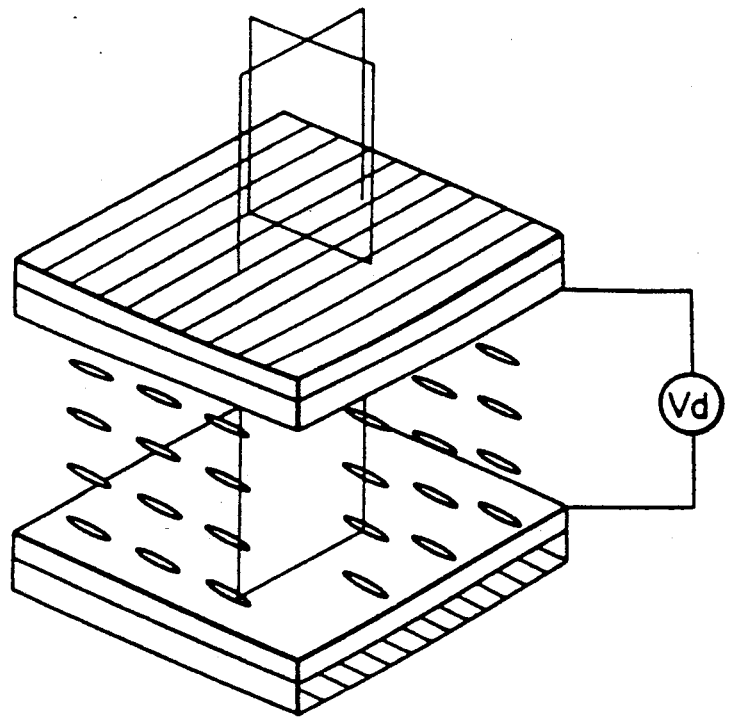
Figure 10C:
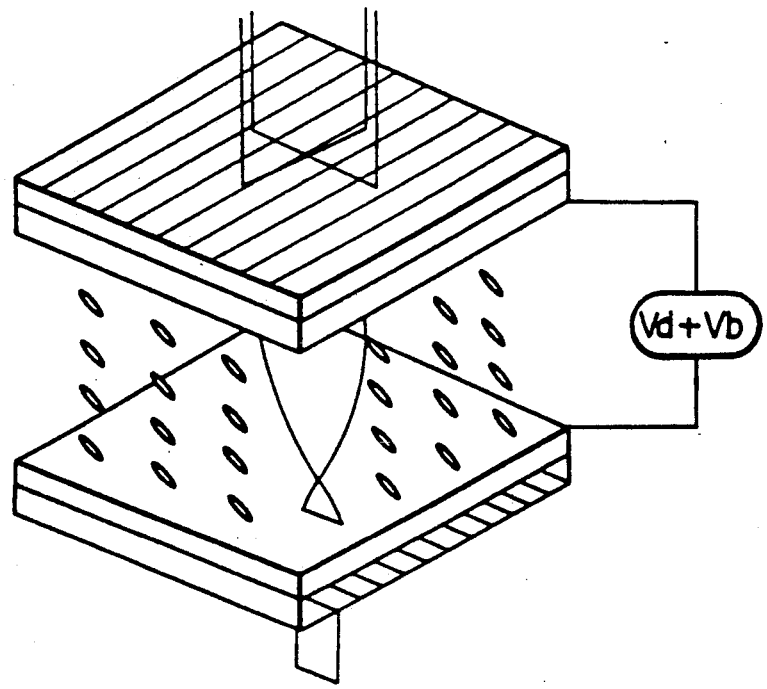

In the PAC liquid crystal display, a cholesteric phase liquid crystal in which the helical structure is eliminated by the alignment-regulating force of the oriented film is used. If the liquid crystal in this state is uniformly aligned in parallel or vertically to the substrate and is set under cross Nichol, a birefringence effect is produced in the liquid crystal layer as a whole by the optical rotatory power of individual cholesteric phase liquid crystal molecules. Accordingly, as shown in FIG. 10, the incident light in which the oscillation is uniformalized to longitudinal oscillation by passage through a polarizing plate 1 undergoes optical rotation in the liquid crystal layer and the longitudinal oscillation is changed to lateral oscillation. Accordingly, the light is allowed to pass through a polarizing plate, whereby a bright state is produced. On the other hand, if the drive voltage is applied, the direction of the liquid crystal molecules changes slightly against the strong alignment-regulating force, with the result that the optical rotatory power of the incident light is changed and the light is not allowed to pass through the polarizing plate 2, whereby a dark state is produced.

At this time, the drive voltage slightly changes the alignment of the liquid crystal molecules against the strong the alignment-regulating force, but if an alternating voltage having a frequency higher than that of the driving wave form is applied as the bias voltage, the liquid crystal is aligned by this electric field in a direction deviated slightly from the direction determined inherently by the alignment-regulating force. If the drive voltage is applied in this state, a force which is apparently larger than the force applied when a bias voltage is not applied is imposed on the liquid crystal molecules (since the alignment of the liquid crystal molecules need not be changed against the strong alignment-regulating force by this driving voltage, a larger driving torque is transmitted to the liquid crystal molecules). Accordingly, the alignment direction of the liquid crystal molecules is greatly changed by application of the drive voltage, and the amplitude of the light transmission is greatly changed. In the PAC, since this large force is applied to the liquid crystal aligned uniformly in the panel, a more stable gradation display can be obtained than in a conventional TN.

Accordingly, even where a drive electric field of the same wave form and the same wave height is applied, by superimposing a bias voltage thereon or applying a bias voltage having a different wave height, light switching or a high contrast ratio and gradation switching become possible. If this method is combined with a color filter, a half tone can be displayed, that is, a full color display becomes possible.

Figure 4:
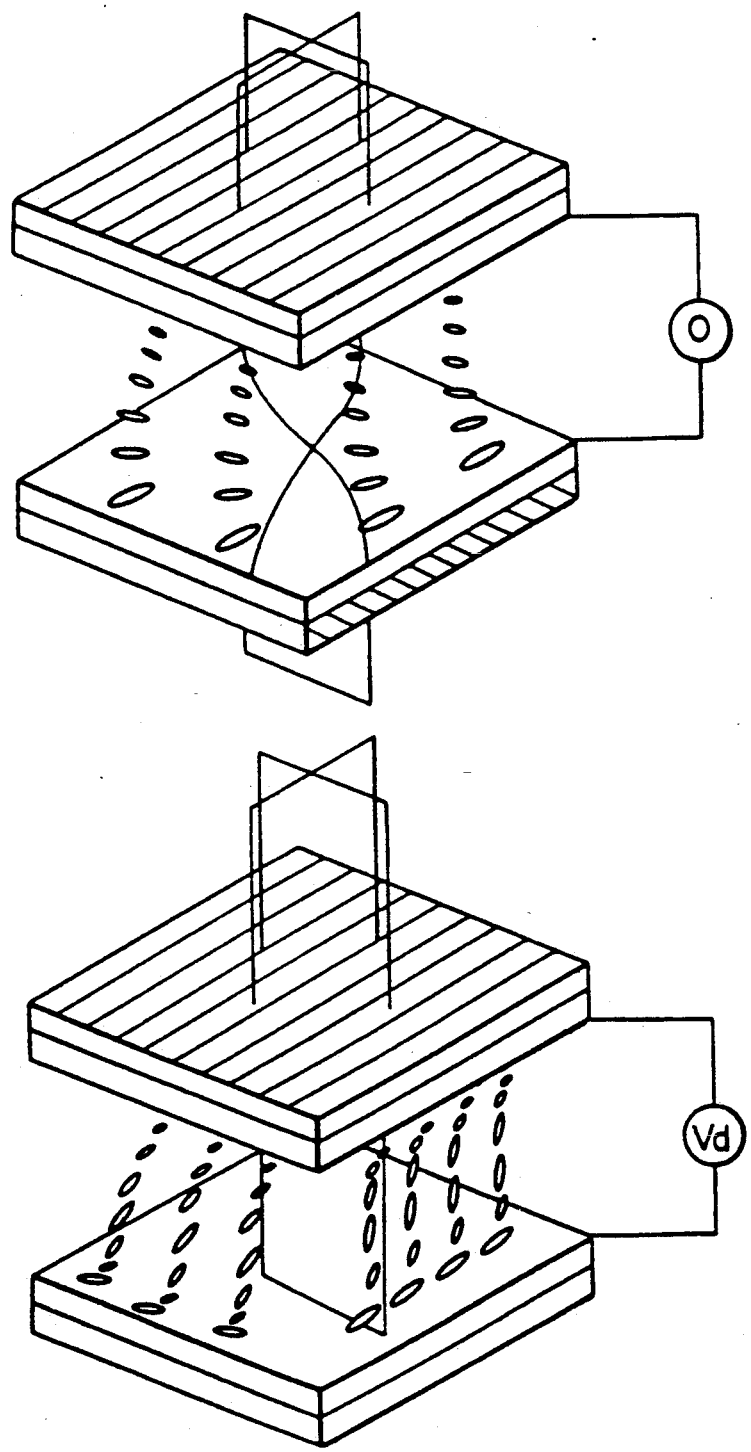
FIG. 4 is a diagram illustrating the driving principle of a conventional TN.

In contrast, in the conventional TN liquid crystal display, gradation display is obtained by controlling the applied voltage by the active matrix drive, controlling the effective voltage by the simple matrix drive, and thus changing the retardation of liquid crystal molecules to change the light transmission, as shown in FIG. 4. Therefore, it is difficult to obtain a stable multi-staged gradation display.

According to the present invention, there is provided still another method for driving the above-mentioned liquid crystal element in an X,Y simple matrix electrode panel, which comprises the steps of (1) applying to all of the electrodes a voltage $V_H$ ($+V_3$ in FIG. 13) having a positive polarity necessary for reducing the light transmission to a saturation value, (2) applying to selected points a voltage $V_L$ ($+V_2$ in FIG. 13) having a positive polarity lower than the voltage $V_H$ but higher than the voltage ($+V_1$ in FIG. 13) just before the light transmission is changed to a low value from a high value, (3) applying a voltage having a negative polarity lower than $-V_H$ ($-V_3$ in FIG. 13) to non-selected points, and (4), subsequent to the step (3), applying a voltage lower than $V_H$ but higher than $V_L$ to the non-selected points and retaining that voltage at the non-selected points.

According to this method, it is possible to prevent cross talk caused by an increase of the display capacity in the multiplexing drive and to prevent an increase of the wave height value of the voltage.

Figure 13:
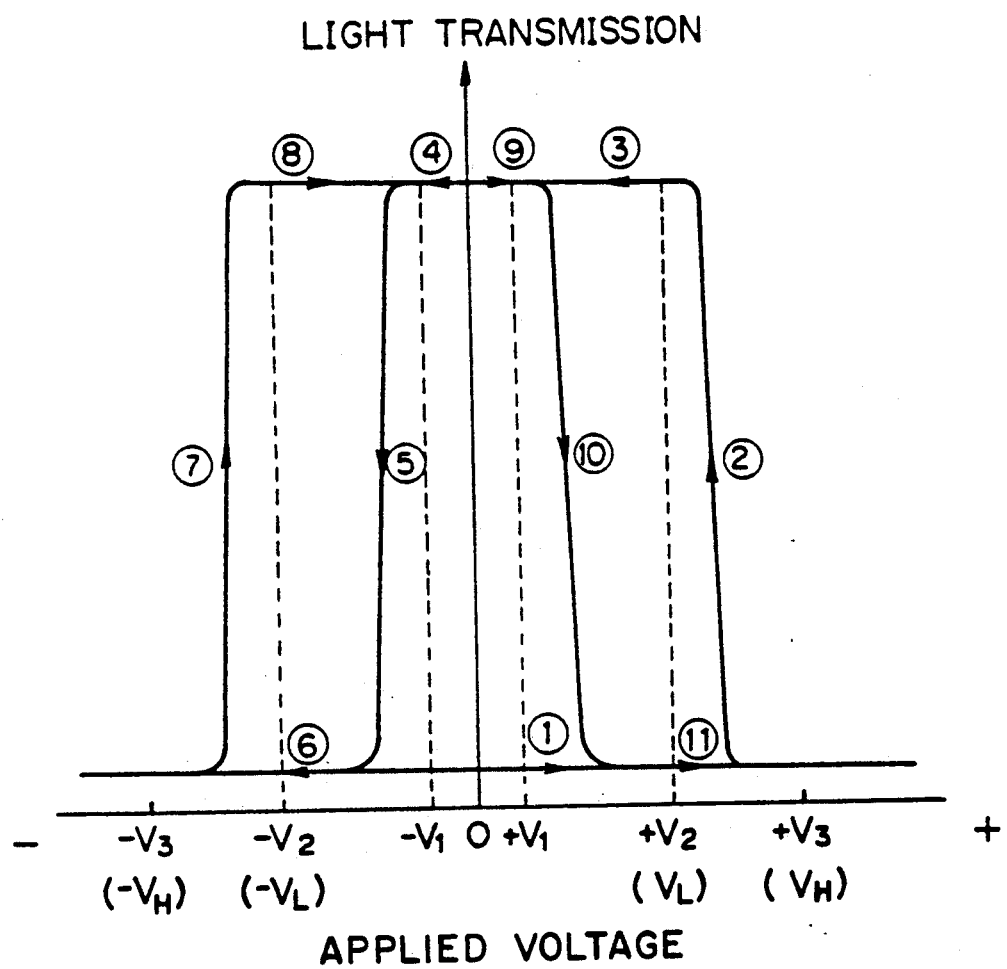
FIG. 13 is a diagram illustrating the principle of the present invention.

In the PAC mode where the helical structure of the chiralnematic liquid crystal is eliminated by the liquid crystal molecule alignment-regulating force by the liquid crystal-oriented film, since individual liquid crystal molecules or masses of liquid crystal molecules have an optical rotatory power, if the liquid crystal molecules are uniformly aligned by the alignment-regulating force of the oriented film, the liquid crystal layer shows an optical rotatory power at a high contrast. It has been found that if a direct current voltage is applied at $0 \rightarrow +V \rightarrow 0 \rightarrow -V \rightarrow 0$ to the liquid crystal in this state, the light transmission is changed as ① → ② → ③ → ... → 11 according to the polarity of the applied voltage and the order of application, as shown in FIG. 13. In the PAC mode, the alignment-regulating force is balanced by the force of maintaining the helical structure of the chiralnematic phase, and the liquid crystal molecules are aligned slightly inclined to the glass substrate. Since this slightly inclined liquid crystal is positive in the dielectric constant anisotropy, if a voltage is applied between the upper and lower substrates, all of the liquid crystal molecules will be aligned in the direction of the electric field, that is, vertically to the substrates. At this point, since the equilibration position of the liquid crystal molecules before application of the electric field is slightly inclined to the substrates, the equilibrium position differs among the case where the electric field intensity is changed from a low level to a high level, the case where the electric field intensity is changed from a high level to a low level, and the case where the polarity of the electric field is changed from a positive polarity to a negative polarity or from a negative polarity to a positive polarity, and therefore, a double hysteresis loop as shown in FIG. 13 is obtained.

The double hysteresis loop shown in FIG. 13 does not depend on the number of scanning lines of the simple matrix panel, as long as the applied voltage is maintained at a constant value. Accordingly, by applying a voltage as shown in FIG. 14, driving can be effected irrespective of the number of scanning lines, while maintaining the constant applied voltage even if the number of scanning lines is increased. In short, driving can be performed without increasing the voltage resistance of the drive IC, even if the number of scanning lines is increased.

Note, the driving wave form shown in FIG. 14 is an example, and a wave form in which the polarity is completely reversed and a wave form for applying $-V_2$ and $+V_2$ alternately are effectively used in the present invention.

Where driving is effected by the wave form shown in Fig. 14, at the point of (a) → (b) in FIG. 14, namely, at the time of switching of the applied voltage to $+V_2$ from $+V_3$, writing to selected points is effected. In the PAC mode, 100 to 300 μs are generally required for this writing, and therefore, even where 400 scanning lines are driven, writing is possible at a high speed such as 40 to 120 ms. The applied voltage $V_2$ at the time of writing to selected points must be a voltage having the positive polarity lower than the above-mentioned voltage $V_3$ but higher than the voltage just before the light transmission is changed to a low level from a high level.

Writing to non-selected points is effected by application of a voltage of the negative polarity lower than $-V_3$, and then a voltage lower than $V_3$ but higher than $V_2$ is applied to non-selected points and this voltage is retained at the non-selected points. By this operation, as described above, the applied voltage can be maintained below a certain level even if the number of scanning lines is increased.

In contrast, in the conventional driving method, as described hereinbefore with reference to FIG. 8, it is difficult to obtain a high information content display without cross talk by the multiplexing drive.

When driving the liquid display element of the present invention, a high-frequency electric field may superimposed on the electric field for driving the liquid crystal. By this method, the disturbance of the alignment of the liquid crystal at the time of an application of the electric field can be corrected, and the contrast ratio highly improved.

The present invention will now be described in detail with reference to the following examples that by no means limit the scope of the invention.

EXAMPLE 1

A glass substrate having a transparent electroconductive film (ITO) attached thereto was washed and dried, and magnesium fluoride ($MgF_2$) was vacuum-deposited on the glass substrate at a plasma output of 70 W by an ion plating with a high frequency-excited method. The substrate was then rubbed. Two of the so-rubbed substrates were arranged so that the rubbing directions were in parallel to each other, and alumina ($Al_2O_3$) having a particle size of 0.7 μm was arranged as a spacer to construct a liquid crystal panel. A cholesteric phase liquid crystal comprising a nematic mixed liquid crystal Nr 2801 supplied by Roche and a chiralnematic liquid crystal CB-15 supplied by BDH, at a weight ratio of 80/20, was sealed into the panel. The helical pitch of the mixed liquid crystal was 0.7 μm as measured at 25° C. The thickness of the liquid crystal layer (panel gap) was 1.5 μm by actual measurement. When the thickness of the anchoring layer of the oriented film (the thickness of the liquid layer on which the strong alignment-regulating force is extended) in this liquid crystal panel was determined by measuring the optical rotation power at various panel gaps by an optical rotatory power matter, it was found that the thicknesses on the upper and lower substrates were each 0.6 μm, so that the total thickness of the anchoring layer was 1.2 μm. This method for measuring the thickness of the anchoring layer is described in detail in Japanese Unexamined Patent Publication No. 62-169007 entitled "METHOD FOR MEASURING THICKNESS OF LIQUID CRYSTAL ANCHORING LAYER", by the present inventors.

Figure 3:
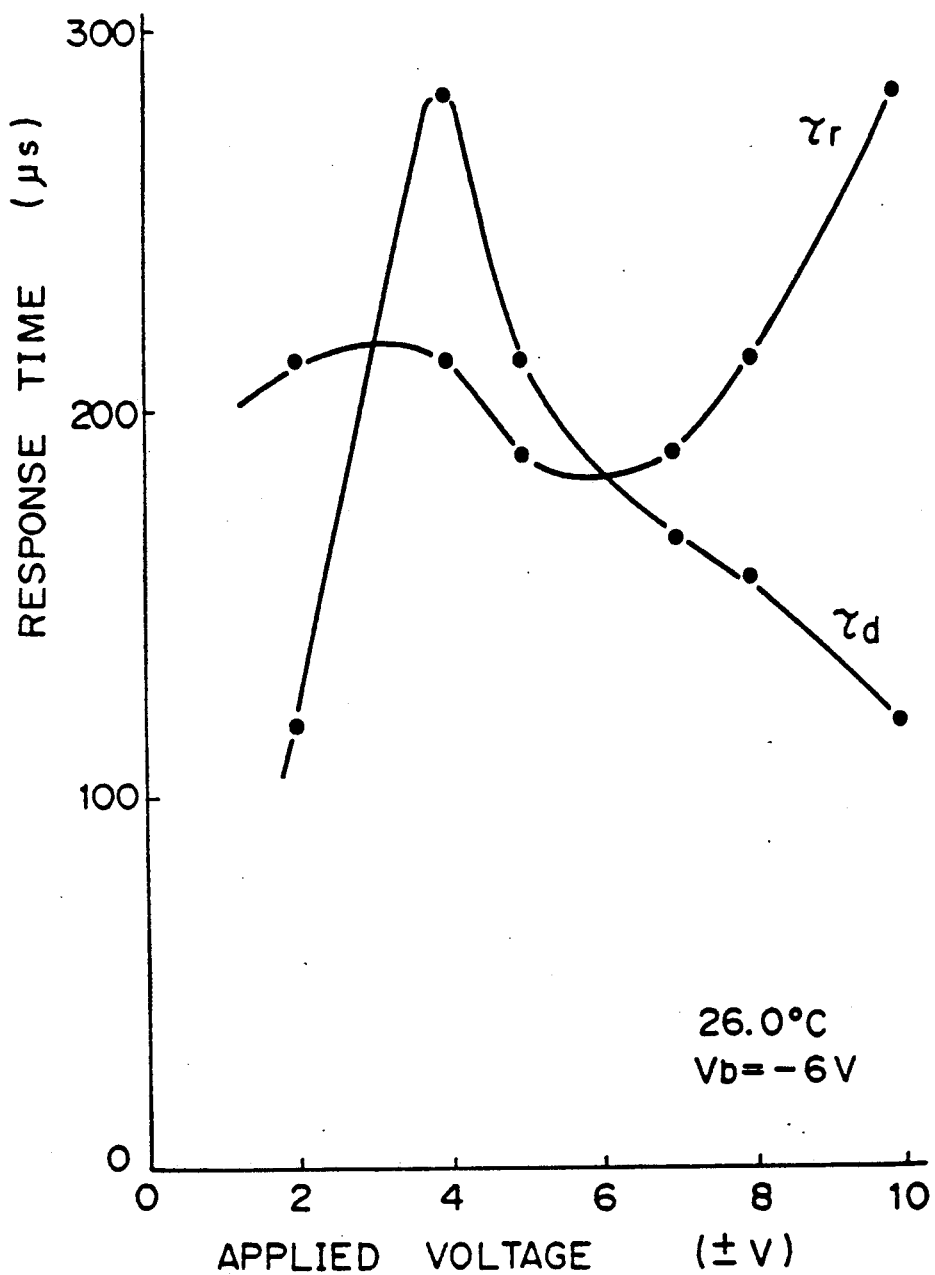
FIG. 3 is a graph illustrating the actual measurement data of the response time of a PAC.

After sealing the liquid crystal, the panel was set at a polarization microscope set at cross Nichol, a rectangular wave (±) of 1 KHz offset at −6 V was applied by a pulse generator (a bias voltage of −6 V was applied and ± rectangular wave of 1 KHz was applied), and the response time to the applied voltage (rise $\tau_r$: the time required for 10–100% change of the light transmission, fall $\tau_d$: the time required for 90–0% change of the light transmission) was measured. The results are shown in FIG. 3. As apparent from FIG. 3, at the drive voltage of about ±6 V, each of $\tau_r$ and $\tau_d$ showed a response of 180 μs. This response speed was about 1000 times the response speed in a TN or SBE by the conventional refresh driving, where the one-picture response time (for example, a panel of 640×400 picture elements) was a couple of hundred milliseconds.

When the so-called rise sharpness of the light transmission to the applied voltage was measured, in the case of the refresh driving by the average-leveling method as in the TN and SBE, it was found that the duty ratio capable of a providing the contrast ratio (transmitted light quantity ratio) higher than 4/1 was lower than 1/300, and therefore, the scanning line number could be set at 300 or more and the capacity could be increased to a level necessary for flat panel display for OA.

The contrast ratio had a large dependency on he bias voltage. The highest contrast voltage was obtained when the bias voltage was +5 V, and the highest contrast ratio was 15:1 (transmitted light quantity ratio). When a bias voltage was not applied, the contrast ratio was about 7:1.

When the incidence angle dependency of the contrast ratio was measured, a broad incidence angle (angle between the normal of the substrate and the incident light) of 25° (open angle of 50° both the sides of the normal) could be taken for obtaining a contrast ratio of at least 4:1.

EXAMPLE 2

A glass substrate of 60 mm×70 mm×1.1 mm having a transparent electroconductive film attached thereto was washed and magnesium fluoride (MgF$_2$) was vacuum-deposited at a plasma output of 70 W by a high-frequency excitation ion plating apparatus, followed by rubbing. Two of the rubbed substrates were arranged so that the rubbing directions were in parallel to each other. Alumina (Al$_2$O$_3$) having a particle size of 0.7 μm was arranged as a spacer to construct a liquid crystal panel. An X-Y stripe pattern was formed on the transparent electroconductive film, and each film had three stripe electrodes having a width of 8 mm. The upper and lower substrates were assembled so that the stripe electrodes of the upper substrate were orthogonal to those of the lower substrate and nine crossing points were formed. A cholesteric phase liquid crystal comprising nematic mixed liquid crystal Nr 2801 supplied by Roche and a chiralnematic liquid crystal CB-15 supplied by BDH, at a weight ratio of 80/20, was sealed into the panel.

Figure 7:
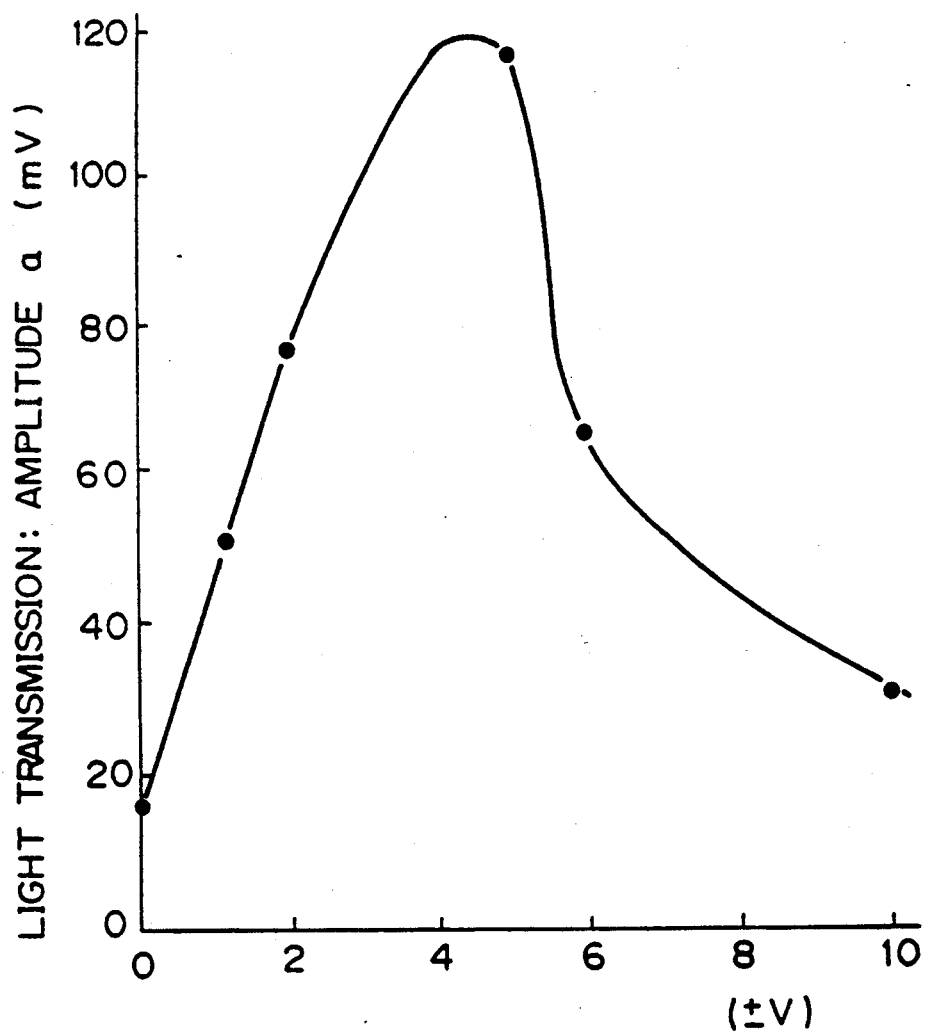
FIG. 7 is a diagram showing measured values of the applied voltage and light transmission.

After sealing the liquid crystal, the panel was set at a polarization microscope set at cross Nichol, and the bias voltage was set at −5 V D.C. and a rectangular wave of 1 KHz was applied. The relationship between the voltage and the light transmission was measured. The results are shown in FIG. 7. When voltages were applied to electrodes X and Y of the panel in the order of (a), (b), and (c) as shown in FIG. 6, so that Vd was set at +4 V, it was confirmed that a display could be effected without cross talk, no coloration of the background occurred, and the rise time was 220 μs and the fall time was 200 μs (as measured at room temperature, 25° C.).

EXAMPLE 3

A glass substrate having a transparent electroconductive film (ITO) attached thereto was washed and magnesium fluoride (MgF$_2$) was vacuum-deposited at a plasma output of 70 W by an ion plating apparatus, followed by rubbing. Two of the so-rubbed substrates were arranged so that the rubbing directions were in parallel to each other, and alumina (Al$_2$O$_3$) having a particle size of 0.7 μm was arranged as a spacer to construct a liquid crystal panel. A cholesteric phase liquid crystal comprising a nematic mixed liquid crystal Nr 2801 supplied by Roche and a chiralnematic liquid crystal CB-15, at a weight ratio of 80:20, was sealed into the panel.

Figure 11:
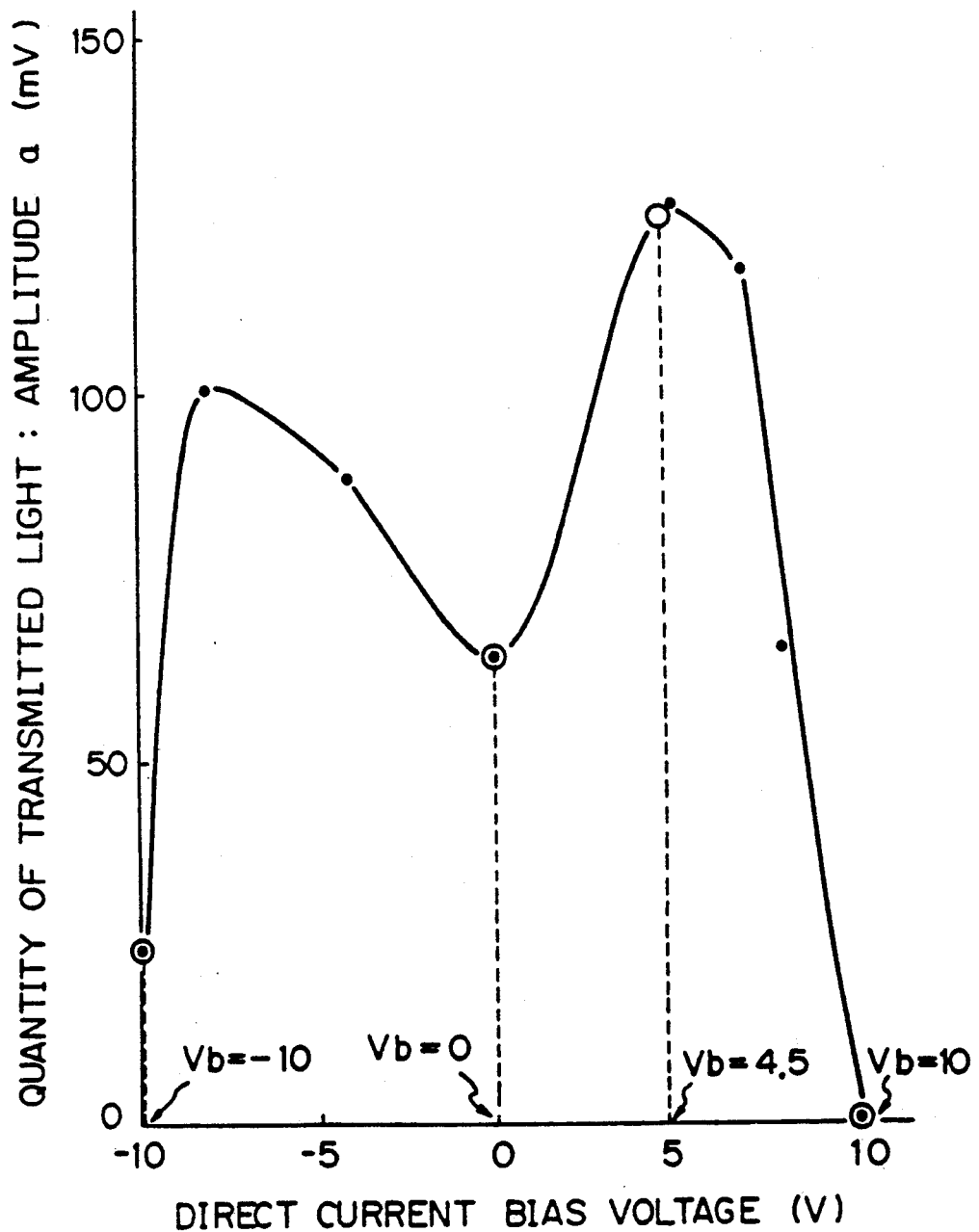
FIG. 11 shows data obtained in the examples.
Figure 12:
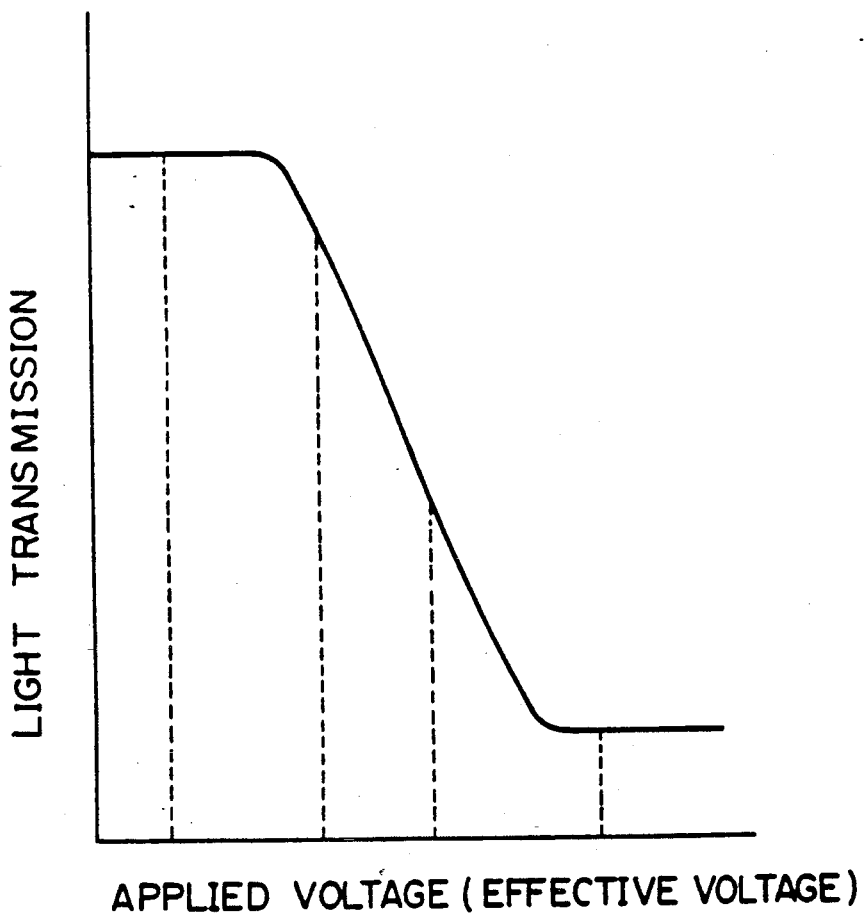
FIG. 12 is a diagram illustrating the principle of gradation display in the conventional technique (TN)

After sealing the liquid crystal, the panel was set at a polarization microscope net at cross Nichol, and a voltage wave height value of 5 V was applied as the drive voltage by the ⅓ bias voltage leveling method shown in FIG. 9. A direct current voltage of from −10 V to 10 V was superimposed as the bias voltage on this drive voltage. As shown in FIG. 11, the quantity of the transmitted light was greatly changed with a change of the bias voltage Vb and the quantity of the transmitted light did not have a direct correlation with the contrast ratio, because the contrast depends on both transmittances between bright and dark states. A change of the contrast ratio exceeding 200 was obtained.

EXAMPLE 4

Figure 15:
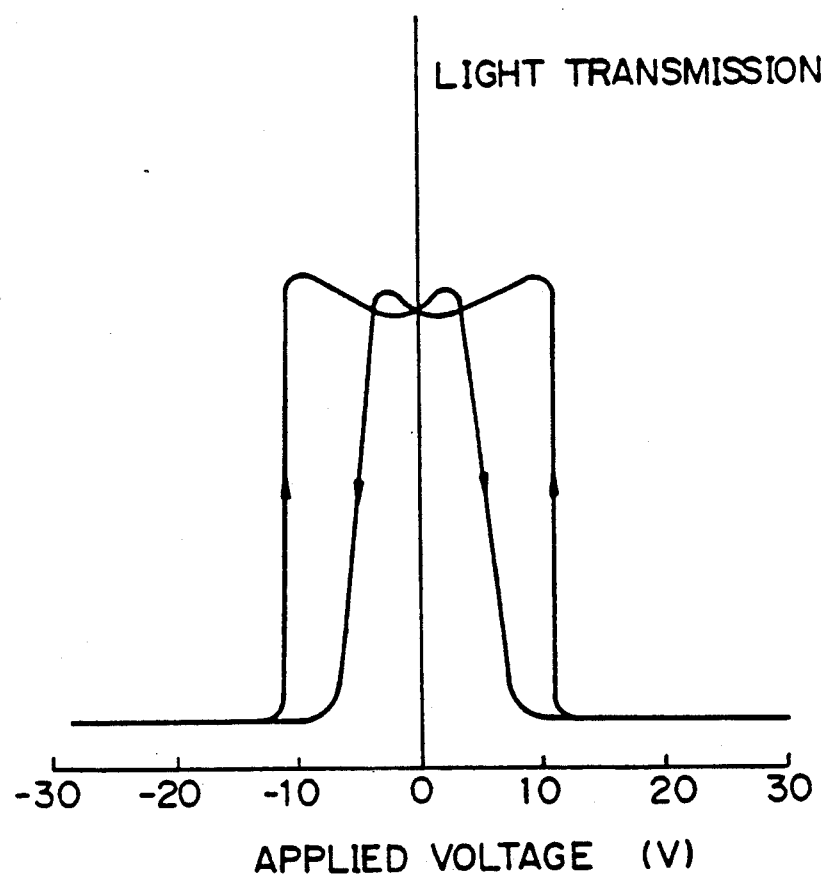
FIG. 15 is a graph illustrating the relationship between the applied voltage and light transmission, observed in the examples of the present invention.

A glass substrate 60 mm×70 mm×1.1 mm (thickness) having a transparent electroconductive film of indium oxide attached thereto was washed, and magnesium fluoride (MgF$_2$) was vacuum-deposited at a plasma output of 70 W by using a high-frequency excitation ion plating apparatus, followed by rubbing with a rubbing apparatus. Two of the so-rubbed substrates were arranged so that the rubbing directions were in parallel to each other. Finely divided alumina (Al$_2$O$_3$) having a particle size of 0.7 μm was arranged as a spacer to construct a liquid crystal panel. The transparent electroconductive film of each substrate had a pattern of three X-Y stripe electrodes having a width of 8 mm, and the upper and lower substrates were assembled so that the strip electrodes of the upper substrate were orthogonal to the stripe electrodes of the lower substrate and nine crossing points were formed. A cholesteric phase liquid crystal comprising a nematic mixed liquid crystal Nr 2801 supplied by Roche and a chiralnematic liquid crystal CB-15 supplied by BDH, at a weight ratio of 80:20, was sealed into the panel. After sealing the liquid crystal, the panel was set at a polarization microscope set at cross Nichol, and sweeping was carried out within a range of from +20 V to −20 V by a triangular wave of 0.5 Hz by using a bipolar power source, and the change of the light transmission according to the applied voltage was recorded as a Lissajou figure by an oscilloscope. As the result, a double hysteresis loop shown in FIG. 15 was obtained. By using this loop, the liquid crystal element was driven while maintaining the initial voltage $+V_3$ at 12 V, the writing voltage $V_2$ to selected points at 7 V, the writing voltage $-V_3$ to non-selected points at −12 V, and the subsequent retention voltage at 7 V. As a result, it was confirmed that, even if the drive was carried out at a duty ratio corresponding to 400 scanning lines, a contrast ratio exceeding 8 was obtained.

EXAMPLE 5

Liquid crystal material consisted of nematic mixture Nr. 3028 available from Hoffman La Roche, doped with chiralnematic liquid crystal CB-15 available from BDH. In order to evaluate experimentally whether the switching times depend on a helical pitch of the liquid crystal mixture, the amount of the doped chiralnematic liquid crystal was varied from 0 to 30 percent by weight as shown in Table 1. For surface alignment, parallel rubbed polyimide was used, and the panel gaps were 2.0 to 2.8 μm as shown in Table 1.

TABLE 1

| | The liquid crystal materials | |
|---|---|---|
| Mixture | Nematic (Nr. 3028) (wt %) | Chiralnematic (CB-15) (wt %) |
| PAC-0 | 100 | 0 |
| PAC-2 | 98 | 2 |
| PAC-5 | 95 | 5 |
| PAC-10 | 90 | 10 |
| PAC-20 | 80 | 20 |
| PAC-30 | 70 | 30 |

The minimum rise time $\tau_r$ and decay time $\tau_d$ for each liquid crystal material, are shown in Table 2.

TABLE 2

| | The rise and decay times of each mixture, and helical pitch (Driving voltage is ±5 V) | | | | | |
|---|---|---|---|---|---|---|
| Mixture | Helical pitch (μm) | $\tau_r$ (μs) | $\tau_d$ (μs) | Panel gap (μm) | D.C. bias (V) | panel gap/ helical pitch (d/p) ratio |
| PAC-0 | — | 2120 | 220 | 2.6 | −2.5 | — |
| PAC-2 | 7.1 | 2630 | 180 | 2.4 | −2.5 | 0.34 |
| PAC-5 | 2.9 | 1060 | 60 | 2.0 | +2.5 | 0.69 |
| PAC-10 | 1.4 | 820 | 305 | 2.8 | −5.0 | 2.00 |
| PAC-20 | 0.9 | 188 | 212 | 2.6 | −6.0 | 2.89 |
| PAC-30 | 0.5 | 153 | 124 | 2.1 | +5.0 | 4.20 |

The helical pitch of the liquid crystal mixture was measured at the room temperature by the wedge type cell method.

In measuring the switching time, the liquid crystal panel was set between crossed polarizers, and its temperature was controlled by a hot stage. The driving voltage $V_d$ was applied to the panel from the pulse generator. The change in light transmission was detected by the photocell, and then recorded by a digital oscilloscope. The rise time, and the decay time were defined as the time needed for a 0–90% transmittance change and a 100–10% transmittance change, respectively.

Table 2 shows that the short helical pitch gives a short rise time. The PAC panel has a 100 μs switching time for a certain D.C. bias voltage. The decay time $\tau_d$ only has a small dependence of the helical pitch of the liquid crystal material. While the rise time $\tau_r$ decreases as the helical pitch decreases. PAC-0 and PAC-2 which contain no chiralnematic or a small amount of chiralnematic with very long helical pitch in comparison to the panel gap, have a rise time longer than 2 ms. In this case, the liquid crystal's chirality is so small that the displacement of the liquid crystal for optical switching is large resulting in a long switching time. The small influence of the helical pitch on the decay time $\tau_d$ suggests that the recovering power of the liquid crystal to its initial aligned state is due to surface anchoring.

Figure 16:
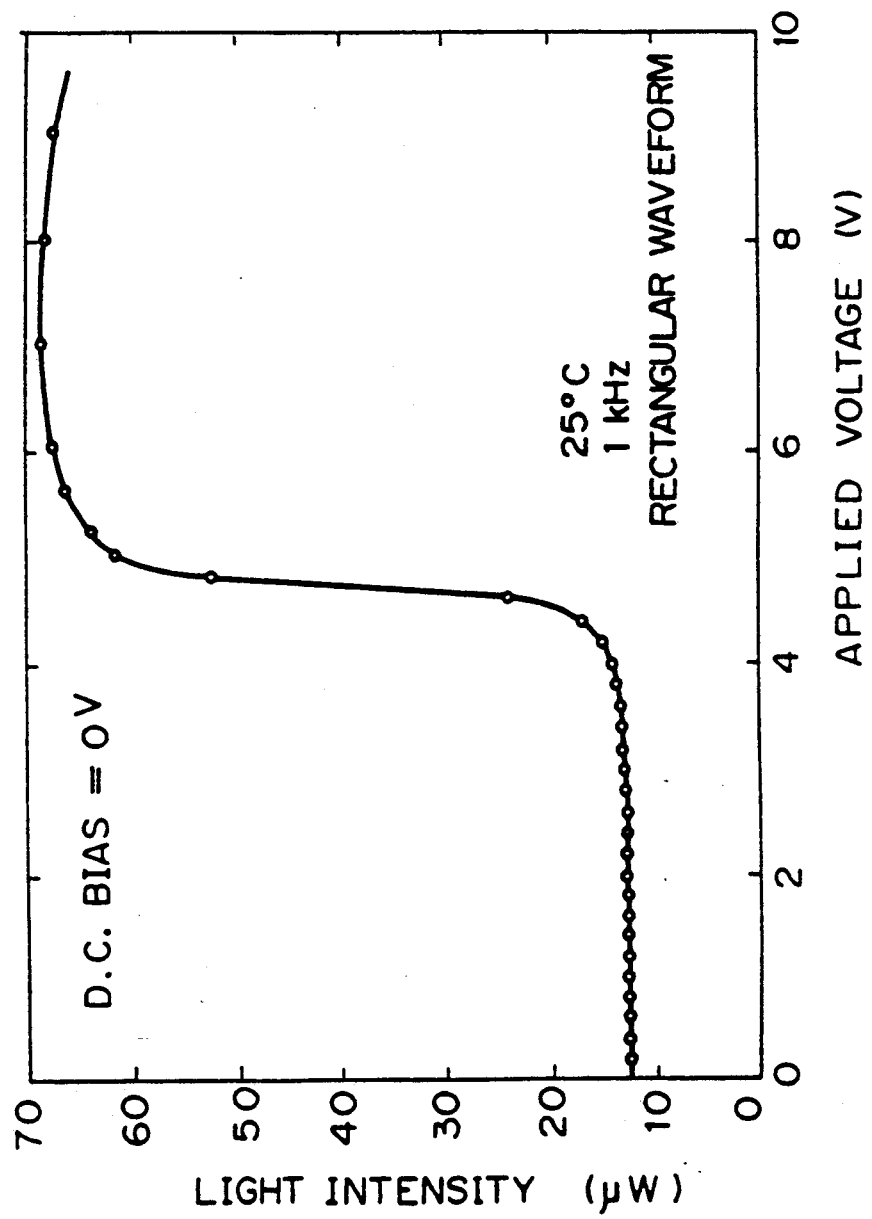
FIG. 16 shows the transmittance-voltage curve of a PAC panel of the present invention.

The uniformly aligned liquid crystal molecules are believed to respond in concert with an applied electric field. Therefore, PAC mode may have a steep transmittance-voltage curve. FIG. 16 shows the transmittance-voltage curve of a PAC panel with the liquid crystal mixture PAC-20.

Figure 17:
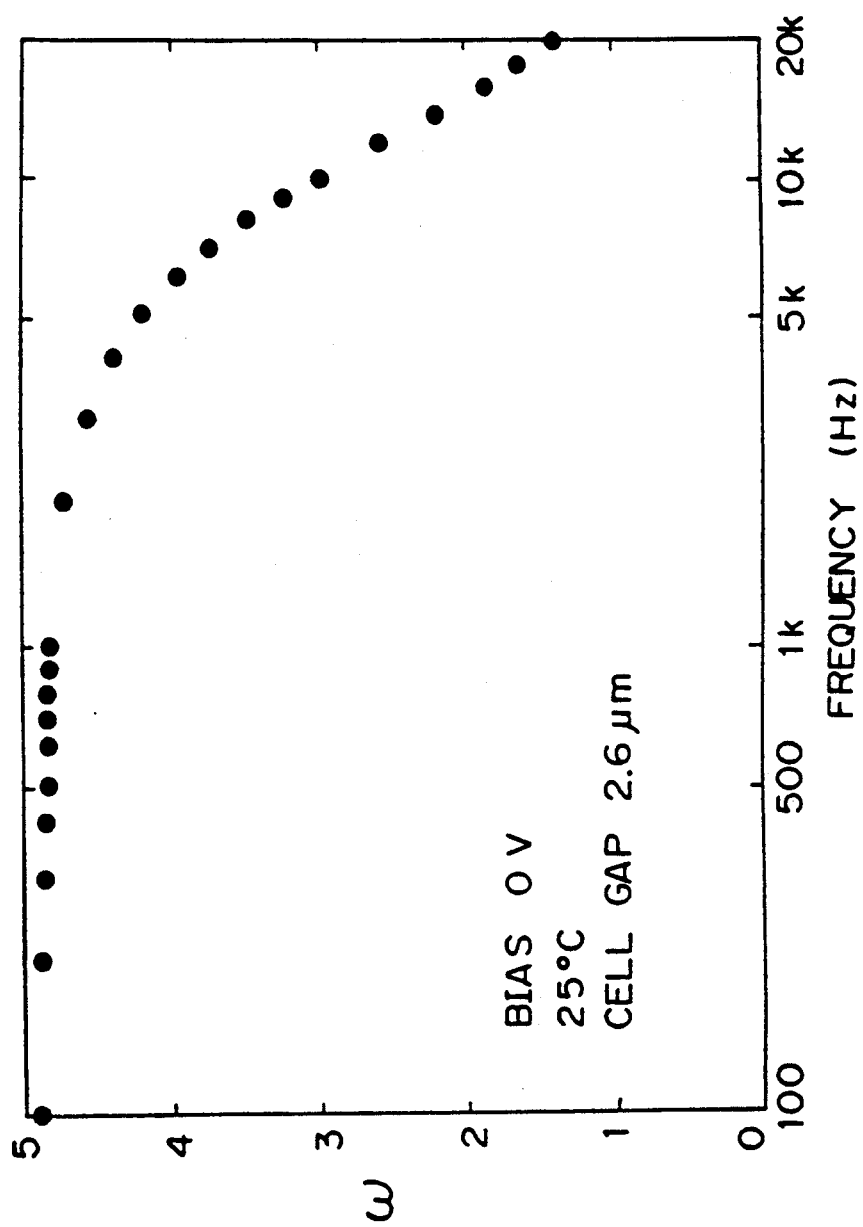
FIG. 17 shows the frequency dependency of the dielectric constant $\epsilon$ of a PAC panel of the present invention.
Figure 18:
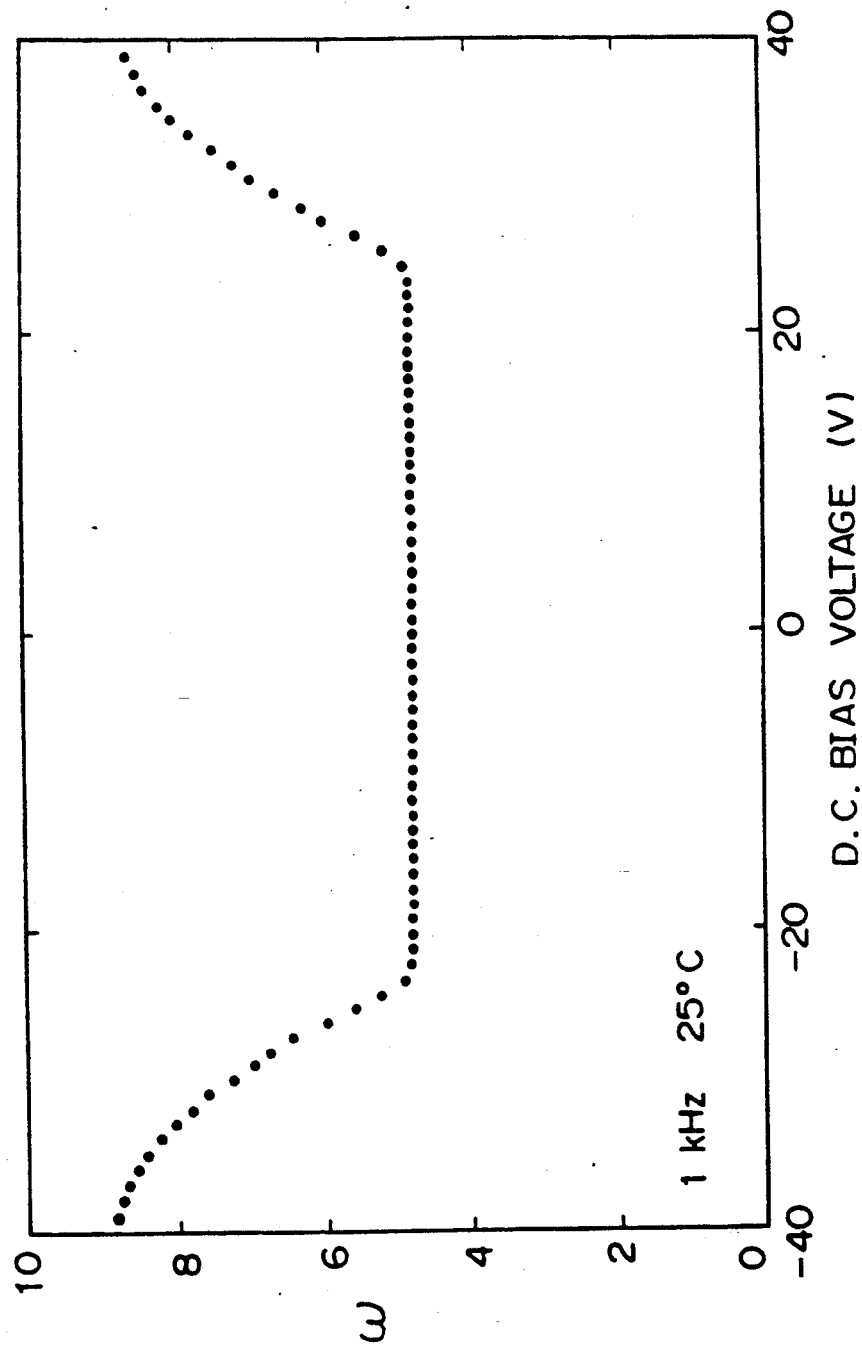
FIG. 18 shows the relationship between $\epsilon$ and the D.C. bias voltage of a PAC panel of the present invention.

The dielectric constant $\epsilon$ of the liquid crystal material PAC-20 changes with the frequency as shown in FIG. 17. FIG. 17 shows that the $\epsilon$ is almost constant until 3 KHz. The D.C. bias dependence of the $\epsilon$ for 1 KHz frequency shown in FIG. 18 suggests that the orientation of the liquid crystal molecule changes. From FIG. 18 it is obvious that more than 24 V is needed to change the direction of the liquid crystal molecule. PAC mode, however, shows optical switching at 6–7 V where no $\epsilon$ change is observed in FIG. 18. The lack of a change in $\epsilon$ suggests that a very small displacement of the liquid crystal brings about the optical switching. We believed that because the displacement is small, the switching occurs quickly.

To obtain simultaneous switching, uniform alignment of the liquid crystal molecules is necessary.

The use of chiralnematic liquid crystal molecules aligned uniformly in a panel with crossed polarizers as shown in FIG. 1. The small displacement of the liquid crystal molecule brings about effective optical switching in a short period of time.

To achieve uniform alignment of the chiralnematic liquid crystal, the thin panel gap was made smaller than the helical pitch of the liquid crystal, and a homogeneous surface alignment with rubbed inorganic or organic polymer film was used.

Figure 19A:
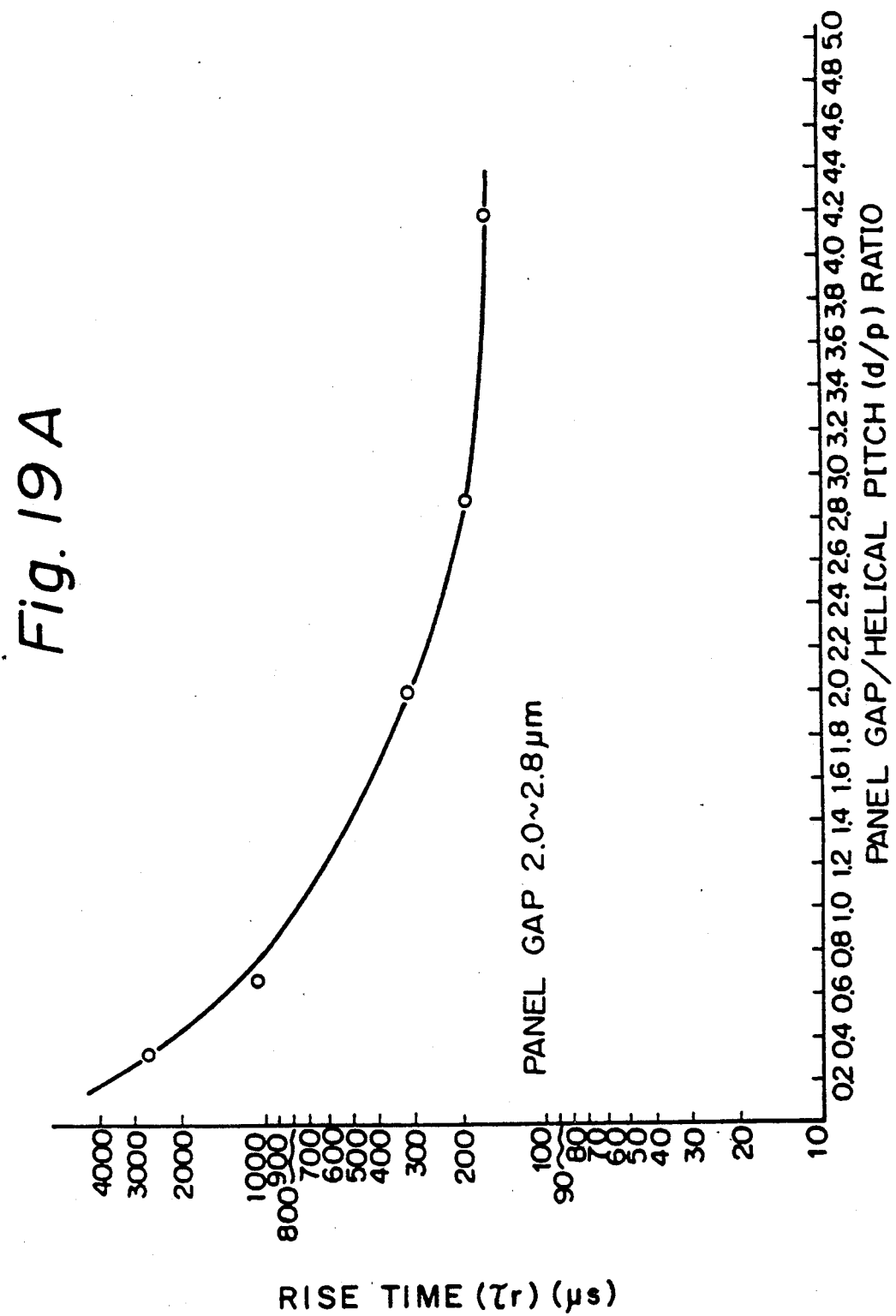
FIGS. 19A, 19B and 19C respectively show the rise time ($\tau_r$) dependence on the panel gap/helical pitch (d/p) ratio, the rise time ($\tau_r$) dependence on the chiralnematic liquid crystal/(chiralnematic liquid crystal + nematic liquid crystal) ratio, and the helical pitch dependence on the chiralnematic liquid crystal/(chiralnematic liquid crystal + nematic liquid crystal) ratio according to an example; and, FIGS. 20A, 20B and 20C respectively show the rise time ($\tau_r$) dependence on the panel gap/helical pitch (d/p) ratio, the rise time ($\tau_r$) dependence on the chiralnematic liquid crystal/(chiralnematic liquid crystal + nematic liquid crystal) ratio, and the helical pitch dependence on the chiralnematic liquid crystal/(chiralnematic liquid crystal + nematic liquid crystal) ratio according to another example.
Figure 19B:
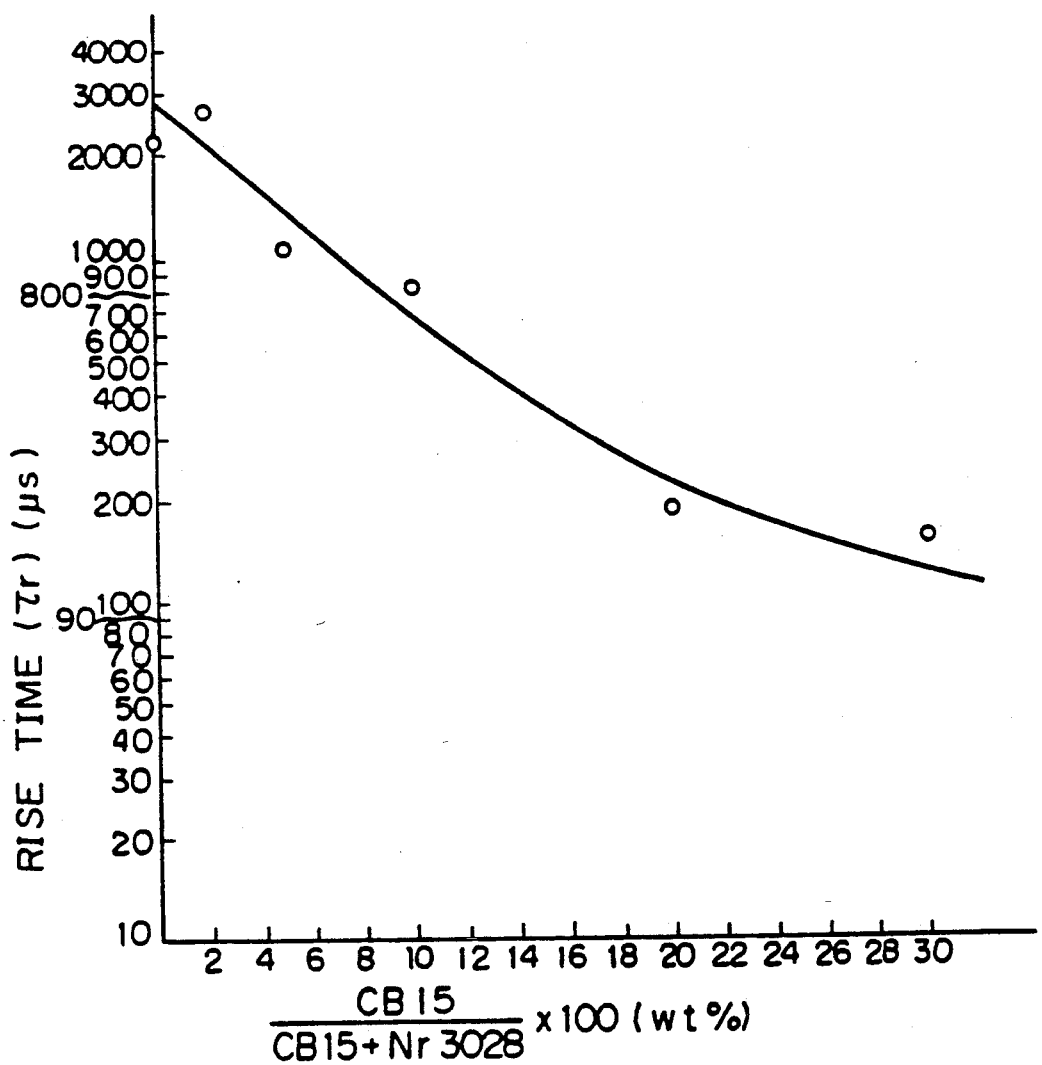
Figure 19C:
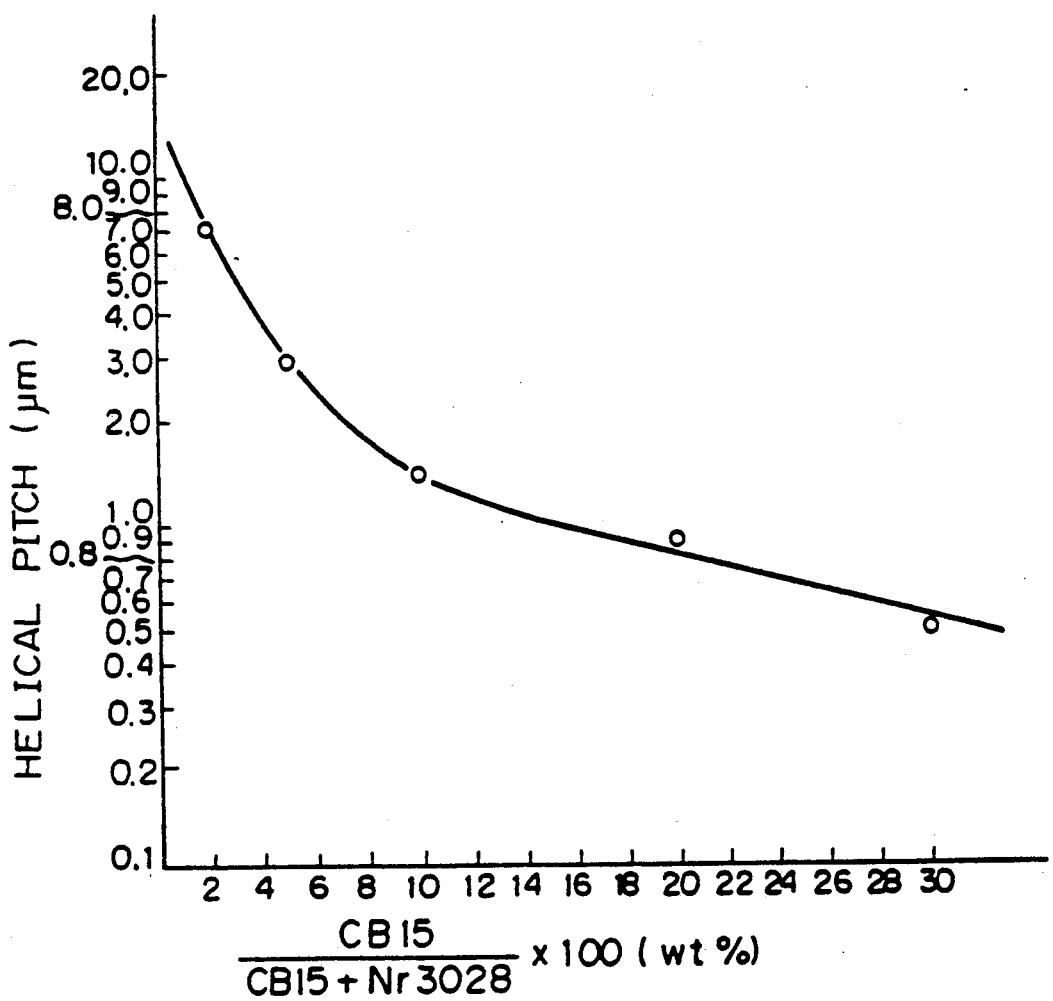

FIGS. 19A and 19B show the rise time ($\tau_r$) dependence on the panel gap/helical pitch (d/p) ratio, the rise time ($\tau_r$) dependence on the chiralnematic liquid crystal/(chiralnematic liquid crystal + nematic liquid crystal) ratio, respectively. FIG. 19C shows the helical pitch dependence on the chiralnematic liquid crystal/(chiralnematic liquid crystal + nematic liquid crystal) ratio. FIGS. 19A–19C are obtained from the data of Table 2.

EXAMPLE 6

In accordance with the procedure described in Example 5, the helical pitch size, d/p in which d is the gap (μm) between the substrates and p is the size (μm) of the helical pitch shown by the cholesteric phase liquid crystal at room temperature when an electric field is not applied, and the rise time $\tau_r$ (μs) were measured at a driving voltage of ±5 V for liquid crystal mixtures of a nematic mixed liquid crystal Nr. 3028 supplied by Hoffman La Roche and a chiralnematic liquid crystal CE 2 supplied by BDH. The results are shown in Table 3 below.

TABLE 3

| Amount of CE 2 added (wt %) | Helical pitch (μm) | Panel gap 3 μm | | Panel gap 2 μm | |
|---|---|---|---|---|---|
| | | d/p | $\tau_r$ (μs) | d/p | $\tau_r$ (μs) |
| 3.0 | 3.1 | 0.97 | 1,100 | 0.65 | 2,800 |
| 4.5 | 2.0 | 1.50 | 730 | 1.00 | 1,200 |
| 6.0 | 1.5 | 2.00 | 450 | 1.33 | 880 |
| 6.5 | 1.4 | 2.14 | 210 | 1.43 | 795 |
| 10.0 | 0.9 | 3.33 | 165 | 2.22 | 285 |
| 13.0 | 0.7 | 4.29 | 120 | 2.86 | 190 |

Figure 20B:
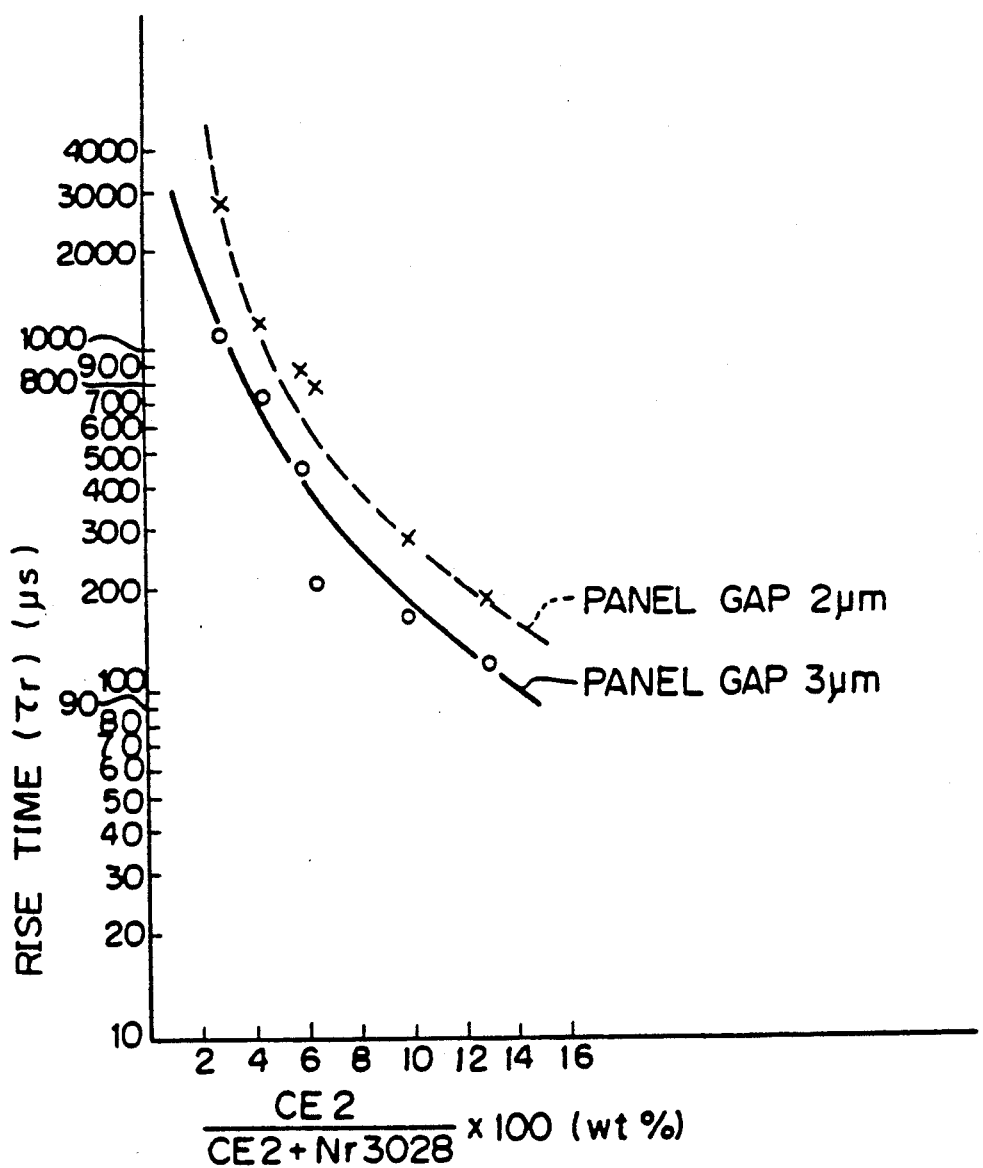
Figure 20:
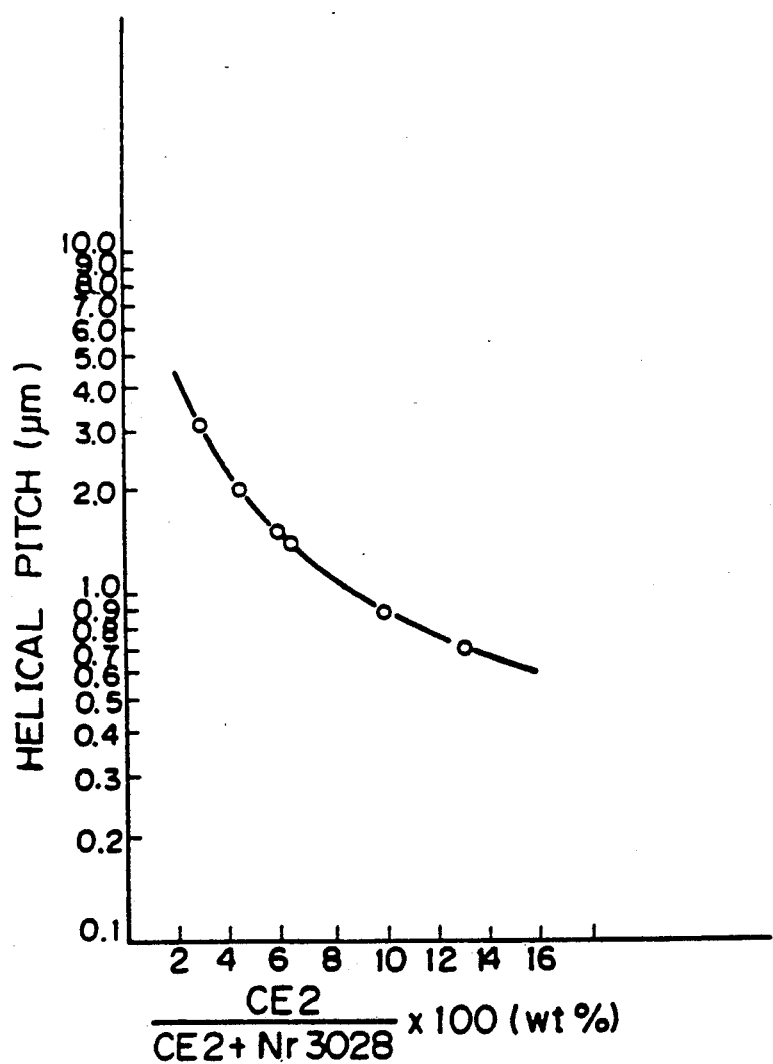

FIGS. 20A and 20B show the rise time ($\tau_r$) dependence on the panel gap/helical pitch (d/p) ratio, the rise time ($\tau_r$) dependence on the chiralnematic liquid crystal/(chiralnematic liquid crystal + nematic liquid crystal) ratio, respectively. FIG. 20C shows the helical pitch dependence on the chiralnematic liquid crystal/(chiralnematic liquid crystal + nematic liquid crystal)-ratio. FIGS. 20A–20C are obtained from the data of Table 3.

From the above Tables 2 and 3, and FIGS. 19A and 20A, it is proved that quick response of less than about 1000 μs can be obtained where d/p is not less than 1, but $\tau_r$ increases drastically where d/p is not more than 1. Therefore, it is necessary that the relationship $d/p \geq 1$ is satisfied.

On the other hand, in the present invention, a liquid crystal composition showing a helical structure in a bulk state is confined in a narrow space to loose the helix within a panel. Therefore, where the gap p is too large as compared with the helical pitch p, it becomes impossible to loose the helix. By the use of the liquid crystal compositions and orientation techniques known in the present state of the art, it may be impossible to loose the helix where the relationship d/p is more than 5. Therefore, it is preferable that the following relationship is satisfied:

$$5 \geq d/p \geq 1.$$

We claim:

1. A method for driving a liquid crystal display element which includes a liquid crystal composition having an optically active compound as at least one constituent and showing a cholesteric phase in a bulk state, wherein the liquid crystal composition is arranged between substrates, at least one of which is provided with a transparent electrode, so that long axes of individual liquid crystal molecules are in parallel to one another and are oriented in the same direction to the surfaces of the substrates, and the long axes of the molecules are uniformly aligned in parallel, vertically or inclined to the surfaces of the substrates, and in an X, Y simple matrix electrode panel having X and Y electrodes, the method comprising the steps of:
   (1) applying to all cross-points of the X and Y electrodes a voltage $V_H$ having a positive polarity necessary for reducing the light transmission to a saturation value, (2) applying to selected points a voltage $V_L$ having a positive polarity lower than said voltage $V_H$ but higher than a voltage just before the light transmission is changed to a low value from a high value, (3) applying a voltage having a negative polarity lower than $-V_H$ to non-selected points, and (4) subsequent to the step (3), applying a voltage lower than $V_H$ but higher than $V_L$ to the non-selected points and retaining said voltage at the non-selected points.

2. A driving method according to claim 1, further comprising the step of providing the liquid crystal composition so that the liquid crystal display element indicates an applied voltage-transmission double hysteresis loop.

3. A driving method according to claim 1, wherein an optical switching can be done with no change in a dielectric constant $\epsilon$ of the liquid crystal material.

4. A driving method according to claim 1, further comprising the step of providing the liquid crystal composition so that a dielectric constant $\epsilon$ of the liquid crystal material is almost constant until 3 KHz.

5. A driving method according to claim 1, further comprising the step of providing as the cholesteric phase liquid crystal a material consisting of a cholesteric liquid crystal, a chiralnematic liquid crystal or a mixture of a nematic liquid crystal and a cholesteric liquid crystal or chiralnematic liquid crystal or a mixture of a nematic liquid crystal and an optically active substance having a good compatibility with a liquid crystal.

6. A driving method according to claim 5, further comprising the step of providing at least 3% by weight of the cholesteric liquid crystal or chiralnematic liquid crystal in the mixture of the nematic liquid crystal and the cholesteric liquid crystal or chiralnematic liquid crystal.

7. A driving method according to claim 6, further comprising the step of providing at least 3% by weight of the optically active substance in the mixture of the nematic liquid crystal and the optically active substance.

8. A driving method according to claim 7, further comprising the step of providing 1-menthol or 1-adrenaline as the optically active substance.

9. A driving method according to claim 1, further comprising the step of providing the liquid crystal composition so that the size of the helical pitch shown by the cholesteric phase liquid crystal at room temperature when an electric field is not applied is smaller than 1.5 μm.

10. A driving method according to claim 1, further comprising the step of providing a liquid crystal panel comprising the liquid crystal interposed between two polarizing films.

11. A driving method according to claim 1, further comprising the step of providing the liquid crystal composition so that the thickness of a layer of the cholesteric phase liquid crystal undergoing regulation of alignment by a liquid crystal-oriented film interface mutual action is at least ⅓ of the entire thickness of the liquid crystal.

12. A driving method according to claim 1, further comprising the step of providing the liquid crystal layer with a thickness of between 1 to 5 μm.

* * * * *